United States Patent
Ogasawara et al.

(10) Patent No.: US 7,016,269 B2
(45) Date of Patent: Mar. 21, 2006

(54) OPTICAL PICKUP APPARATUS AND FOCUSING CONTROL METHOD

(75) Inventors: Masakazu Ogasawara, Tsurugashima (JP); Ikuya Kikuchi, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 276 days.

(21) Appl. No.: 10/022,843

(22) Filed: Dec. 20, 2001

(65) Prior Publication Data

US 2002/0159342 A1 Oct. 31, 2002

(30) Foreign Application Priority Data

Dec. 21, 2000 (JP) .............. 2000-388541
Feb. 2, 2001 (JP) .............. 2001-027301

(51) Int. Cl.
*G11B 7/00* (2006.01)

(52) U.S. Cl. .............. 369/44.25; 369/44.26; 369/94

(58) Field of Classification Search .......... 369/112.01, 369/44.23, 44.24, 44.26, 44.35, 94, 44.25, 369/53.1, 53.2
See application file for complete search history.

(56) References Cited

U.S. PATENT DOCUMENTS

| | | | |
|---|---|---|---|
| 5,243,585 A | 9/1993 | Hoshino et al. ......... | 369/44.41 |
| 5,391,865 A | 2/1995 | Kurata et al. ......... | 250/201.5 |
| 6,125,087 A | 9/2000 | Ohnishi et al. ......... | 369/44.23 |
| 6,226,239 B1 | 5/2001 | Nishiuchi et al. ...... | 369/44.27 |
| 6,292,441 B1 * | 9/2001 | Yamamoto et al. ...... | 369/44.23 |

FOREIGN PATENT DOCUMENTS

| EP | 1 107 242 A2 | 6/2001 |
|---|---|---|
| EP | 1 107 242 A3 | 6/2001 |

* cited by examiner

Primary Examiner—Nabil Hindi
(74) Attorney, Agent, or Firm—Drinker Biddle & Reath LLP

(57) ABSTRACT

An optical pickup apparatus having an irradiation optical system for condensing a light beam on a track of a recording plane and a photodetection optical system for guiding return light to a photodetector to detect a focal error includes a holographic lens provided in the optical path of the return light for outputting 0-th and ±1st order diffracted lights based on the return light; an optical element provided in front of or behind the holographic lens for providing astigmatism; photodetectors for receiving the 0-th and ±1st order diffracted lights; and servo-signal generating operation circuits connected to the photodetectors for generating a first and second focus error signals having a first and second capture ranges based on the output signal of the photodetector.

21 Claims, 21 Drawing Sheets

OPTICAL PICKUP APPARATUS AND FOCUSING CONTROL METHOD

BACKGROUND OF THE INVENTION

1. Field of the Invention

The present invention relates to an optical pickup of a recording/reproducing apparatus for an optical recording medium such as an optical disc, and more particularly, to an optical pickup capable of controlling the optimum focusing position of a light beam focused on a recording plane of a recording medium such as an optical disc having multiple recording layers, and a focusing control method therefor.

2. Description of the Related Art

There has been developed a high recording density and mass storage information recording medium referred to as a DVD (Digital Versatile Disc) and a system using the medium. A DVD having a single recording layer on one side of the disc has a capacity of 4.7 GB. There has been developed a two-layer DVD which is compliant with the DVD standard to increase the recording capacity. The use of a high NA optical system and a shorter wavelength light-source has been studied for the next generation multi-layer optical disc system utilizing an optical disc having three or four recording layers in order to further increase the recording capacity. In such a multi-layer optical disc having multiple recording layers stacked alternately with spacer layers therebetween, the focal point (the focused point or optimum condensing position) of a light beam should be set to a recording surface of a desired layer. In other words, a condensed light spot must be irradiated upon a desired recording layer in order to read information from one side of the optical disc using an optical pickup.

The focus setting is generally performed by focus pull-in operation (hereinafter, also simply referred to as "focus pull-in") of servo control in response to a focus error signal FE detected by a focus error detection optical system in order to set the focal point to a desired recording layer. In view of performing reproduction from the multi-layer disc, the focus error signal FE is set so that the capture range (i.e., the focus shift or displacement distance corresponding to the distance between maximum amplitude peaks in the S curve of the signal FE) is set to a value sufficiently smaller than the minimum layer interval (i.e., the thickness of the intermediate layer) among the layer intervals, for example to 1/10 of the layer interval or less. This is for the purpose of excluding as much as possible the effect of light reflected from a recording layer to be reproduced upon other recording layers such as a focus offset caused by interlayer crosstalk. The capture range is determined based on the size or properties of optical elements and light receiving elements in a detection optical system. Focus pull-in operation for a three-layer optical disc 1 shown in FIG. 1 will be considered. A first recording layer is formed on the substrate of the optical disc 1, a second recording layer is formed thereon with an intermediate layer therebetween and a third recording layer is formed thereon with an intermediate layer therebetween. The surface of the third recording layer is protected by a cover layer.

FIGS. 2A and 2B show changes in the focus error signal FE when the relation between the layer interval in the optical disc 1 and the capture range is changed. FIG. 2A shows the focus error signal FE when the capture range is 1/10 of the layer interval. Since the focus error signals from the recording layers have little effect upon each other, a light spot can be focused on a desired recording layer in response to the resulting composite focus error signal FE. However, as can be seen from FIG. 2B showing the focus error signal FE when the capture range is 1/4 of the layer interval, the focus error signals from the recording layers affect each other, and the resulting composite focus error signal FE (solid line) has an error, and therefore a light spot cannot be focused on a desired recording layer. Note that various detection methods have been proposed for the focus error detection optical system such as astigmatism, Foucault, and spot size methods, while the above-described conditions are essential for any of the detecting methods in recording/reproducing information to/from the multi-layer optical disc. The capture range must be sufficiently small in comparison with the recording layer interval.

However, a reduction in the capture range makes the focus pull-in difficult, and a disturbance such as vibration during recording/reproducing operation easily interrupts the focus servo control. In the worst case, the focus servo operation could be out of control, and the objective lens could collide against the surface of the optical disc and damage it. In other words, the playability is seriously impaired. If the above conditions are to be met with a certain sufficient capture range, the recording layer interval must be increased. This means that the distance between the disc surface and each the recording layers must be increased. Accordingly, spherical aberration increases when a high NA objective lens is used and therefore, the use of the high NA objective lens becomes an impediment for the use of the multi-layer optical disc.

Therefore, the layer intervals must be small in order to reduce the spherical aberration caused by the high NA objective lens in association with changes in the thickness of the cover layer. The capture range must be small since the ratio of the layer interval and the capture range must be large. When NA is 0.85, the tolerable distance between the first layer and the furthermost layer (i.e., the n-th layer of an n-layer optical disc) is about 20 $\mu$m or less, and the capture range is 2 $\mu$m or less for a two-layer optical disc, 0.7 $\mu$m or less for a three-layer optical disc, and 0.5 $\mu$m or less for a four-layer optical disc. In other words, the capture range decreases as the number of layers increases.

SUMMARY OF THE INVENTION

The present invention has been made in view of the problems mentioned above, and it is an object of the present invention to provide an optical pickup apparatus which allows focus servo control to be stabilized and at the same time eliminates offsets caused by interlayer crosstalk in a multi-layer optical disc, so that the optimum focusing of a light beam can be achieved on a target recording plane and a focus control method therefor.

To achieve the object, according to one aspect of the present invention, there is provided an optical pickup apparatus having an irradiation optical system for condensing a light beam into a spot on a track on a recording plane of an optical recording medium and a photodetection optical system for guiding return light reflected back from the spot to a photodetector, the optical pickup apparatus detecting the focal error of the light beam, which comprises a holographic lens provided in the optical path of the return light in the photodetection optical system for outputting 0-th order diffracted light and ±1st order diffracted light based on the return light; an optical element provided in front of or behind the holographic lens in the optical path of the return light in the photodetection optical system for providing astigmatism; a photodetector for receiving the 0-th order diffracted light output from the holographic lens; a photodetector for receiving the ±1st order diffracted light output from the holographic lens; a servo-signal generating operation circuit for the 0-th order diffracted light connected to the photodetector for the 0-th order diffracted light for generating a first focus error signal having a first capture range based on the output signal of the photodetector; and a servo-signal generating operation circuit for the ±1st order diffracted light connected to the photodetector for the ±1st order diffracted light for generating a second focus error signal having a second capture range different from the first capture range based on the output signal of the photodetector.

According to another aspect of the present invention, the holographic lens is set so that the 0-th order diffracted light has a greater quantity of light than the ±1st order diffracted light.

According to another aspect of the present invention, the 0-th order diffracted light photodetector includes four independent light receiving portions provided in the vicinity of each other with two orthogonal dividing lines as boundaries, one of the dividing lines being provided parallel to an extending direction of the track, wherein an area of the light receiving portions of positive polarity and an area of the light receiving portions of negative polarity are substantially equal, the light receiving portions of positive polarity and negative polarity being connected to the servo-signal generating operation circuit for the 0-th order diffracted light.

According to another aspect of the present invention, the optical element to provide the astigmatism is a cylindrical lens being provided in the optical path of return light so that the central axis of the optical element extends at an angle of 45° with respect to the track extending direction of the optical disc.

According to another aspect of the present invention, the photodetector for ±1st-order diffracted light includes at least two independent light receiving portions provided in the vicinity of each other with at least two dividing lines extending approximately parallel in a vertical direction to the track extending direction as boundaries, wherein an area of the light receiving portions of positive polarity and an area of the light receiving portions of negative polarity are substantially equal, the light receiving portions of positive polarity and negative polarity being connected to the servo-signal generating operation circuit for the ±1st-order diffracted light.

According to another aspect of the present invention, the first capture range is smaller than the second capture range.

According to another aspect of the present invention, a tracking error signal is generated based on the 0-th order diffracted light.

According to another aspect of the present invention, the first focus error signal is generated by an astigmatism method, and the second focus error signal is generated by a differential spot size method.

According to another aspect of the present invention, there is provided an optical pickup apparatus having an irradiation optical system for condensing a light beam into a spot on a track of a recording layer of an optical recording medium having at least two recording layers stacked upon one another with an intermediate layer therebetween, and a photodetection optical system for guiding return light reflected back from the spot into a photodetector, the optical pickup apparatus detecting the focus error of the light beam, which comprises a focus error signal generation portion for generating a plurality of focus error signals each having a capture range, the capture ranges being different from one another.

According to another aspect of the present invention, the focus error signal generation portion comprises a first focus error signal detection portion for generating a first focus error signal having a first capture range smaller than the smallest of the distances between adjacent recording layers in the optical recording medium; and a second focus error signal detection portion for generating a second focus error signal having a second capture range larger than the first capture range.

According to another aspect of the present invention, the first capture range is at most ⅟10 of the smallest of the distances between the adjacent recording layers.

According to another aspect of the present invention, the second capture range is larger than the sum of the thicknesses of all stacked recording layers and intermediate layers.

According to another aspect of the present invention, the apparatus further comprises a position detection portion for detecting the relative position of the recording layers in the optical recording medium based on the first focus error signal generated by the first focus error signal detection portion; and a selection portion for selecting and relaying at least one of the first and second focus error signals from the first and second focus error signal detection portions in response to a signal generated by the position detection portion.

According to another aspect of the present invention, the apparatus further comprises a focus pull-in portion for performing focus pull-in operation between recording layers most distant from each other among the stacked recording layers in response to the second focus error signal generated by the second focus error signal detection portion, and then performing focus pull-in to a predetermined recording layer in response to the first focus error signal generated by the first focus error signal detection portion.

According to another aspect of the present invention, the apparatus further comprises a focus pull-in portion for performing focus pull-in operation between recording layers most distant from each other among the stacked recording layers in response to the second focus error signal generated by the second focus error signal detection portion, when focus is pulled-in to a predetermined recording layer according to the first focus error signal generated by the first focus error signal detection portion and the first focus error signal generated by the first focus error signal detection portion is beyond a predetermined value.

According to another aspect of the present invention, the apparatus further comprises an offset value portion for adding a predetermined offset value based on the position of a predetermined recording layer to the second focus error signal generated by the second focus error detection portion when focus is pulled-in to the predetermined recording layer according to the first focus error signal generated by the first focus error signal detection portion.

According to another aspect of the present invention, there is provided a focus control method for an optical pickup, the optical pickup having an irradiation optical system for condensing a light beam into a spot on a track on a recording layer of an optical recording medium having at least two recording layers placed on one another with an intermediate layer therebetween; and a photodetection optical system for guiding return light reflected back from the spot to a photodetector, the optical pickup detecting a focus error of the light beam, which comprises the steps of a first focus error signal detection step of generating a first focus error signal having a first capture range smaller than the smallest distance between adjacent recording layers of the optical recording medium; and a second focus error signal detection step of generating a second focus error signal having a second capture range larger than the first capture range.

According to another aspect of the present invention, the second capture range is larger than the sum of the thicknesses of all stacked recording layers and intermediate layers.

According to another aspect of the present invention, the method further comprises a position detection step for detecting the relative position of the recording layers in the optical recording medium based on the first focus error signal generated in the first focus error signal detection step; and a selection step for selecting and relaying at least one of the first and second focus error signals generated in the first and second focus error signal detection steps in response to a signal generated in the position detection step.

According to another aspect of the present invention, the method further comprises a focus pull-in step for performing focus pull-in operation between recording layers most distant from each other among the stacked recording layers in response to the second focus error signal generated in the second focus error signal detection step, and then performing focus pull-in to a predetermined recording layer in response to the first focus error signal generated in the first focus error signal detection step.

According to another aspect of the present invention, the method further comprises a focus pull-in step for performing focus pull-in operation between recording layers most distant from each other among the stacked recording layers in response to the second focus error signal generated in the second focus error signal detection step, when focus is pulled-in to a predetermined recording layer according to the first focus error signal generated in the first focus error signal detection step and the first focus error signal generated in the first focus error signal detection step is beyond a predetermined value.

According to another aspect of the present invention, the method further comprises an offset value adding step for adding a predetermined offset value based on the position of a predetermined recording layer to the second focus error signal generated in the second focus error detection step when focus is pulled-in to the predetermined recording layer according to the first focus error signal generated in the first focus error signal detection step.

DETAILED DESCRIPTION OF THE EMBODIMENTS

First Embodiment

A recording and/or reproducing apparatus (hereinafter, referred to as recording/reproducing apparatus) including an optical pickup according to preferred embodiments of the present invention will be described.

Optical Pickup

Figure 3:
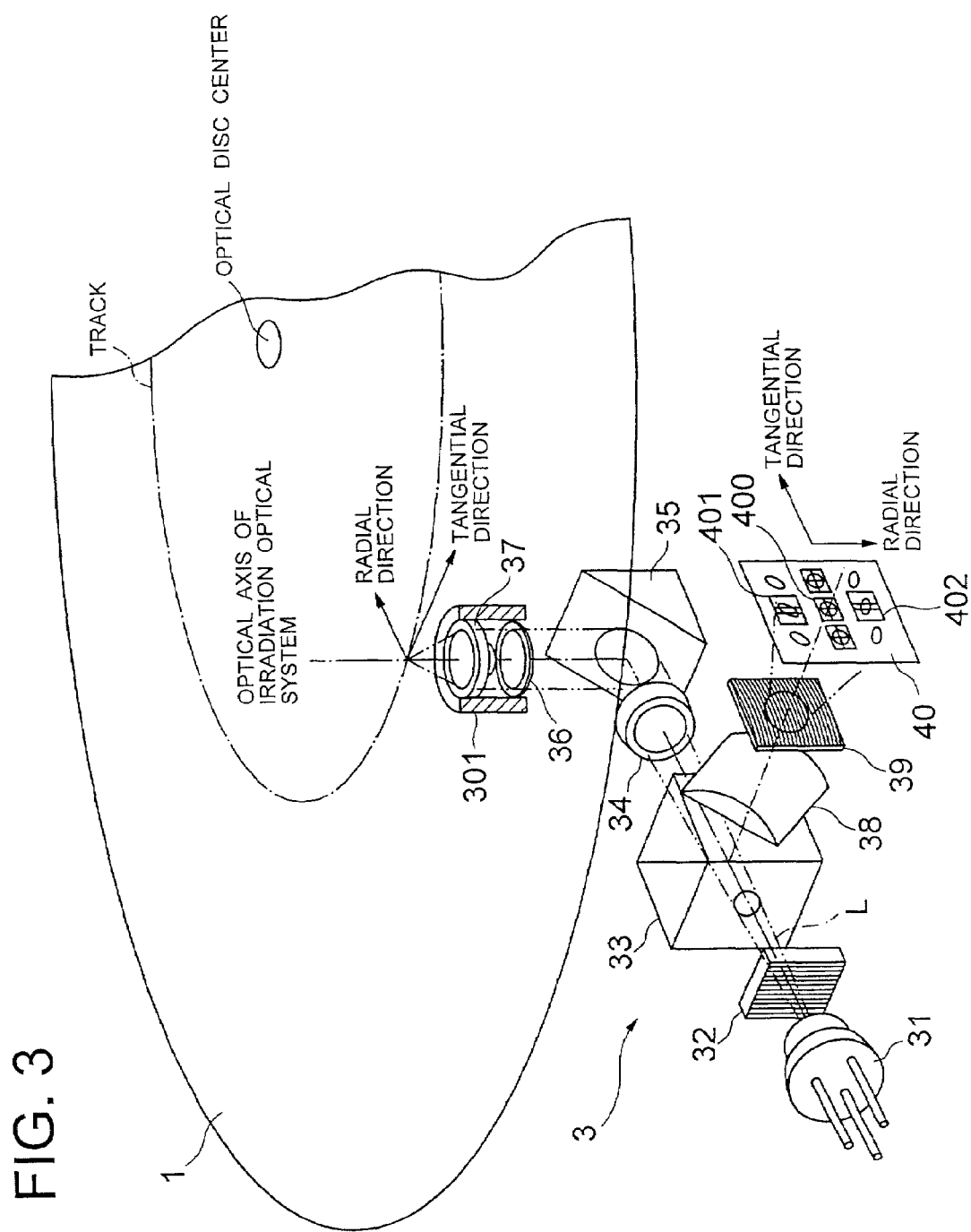
FIG. 3 is a schematic perspective view of the configuration of an optical pickup according to a first embodiment of the present invention.

FIG. 3 is a view showing the configuration of an optical pickup 3 according to a first embodiment of the present invention.

The optical pickup 3 includes a semiconductor laser 31 as a light source, a grating 32, a polarization beam splitter 33, a collimator lens 34, a mirror 35, a ¼ (quarter)-wavelength plate 36, an objective lens 37, an astigmatism generating optical element 38 of a light transmitting material such as a cylindrical lens, a diffraction optical element 39 such as a holographic lens, and a photodetector 40 including a 0-th order diffracted light photodetector 400 and ±1st order diffracted light photodetectors 401, 402. The optical disc 1 is placed apart from the objective lens 37 on the turntable of a spindle motor which is not shown.

The optical pickup 3 contains a focus actuator 301 which allows the objective lens 37 to move in a direction perpendicular to the surface of the optical disc 1 (in the direction of the optical axis) based on the level and polarity of a supplied driving signal, and performs focus servo control to focus a light beam emitted from the light source on a predetermined recording layer.

Figure 4:
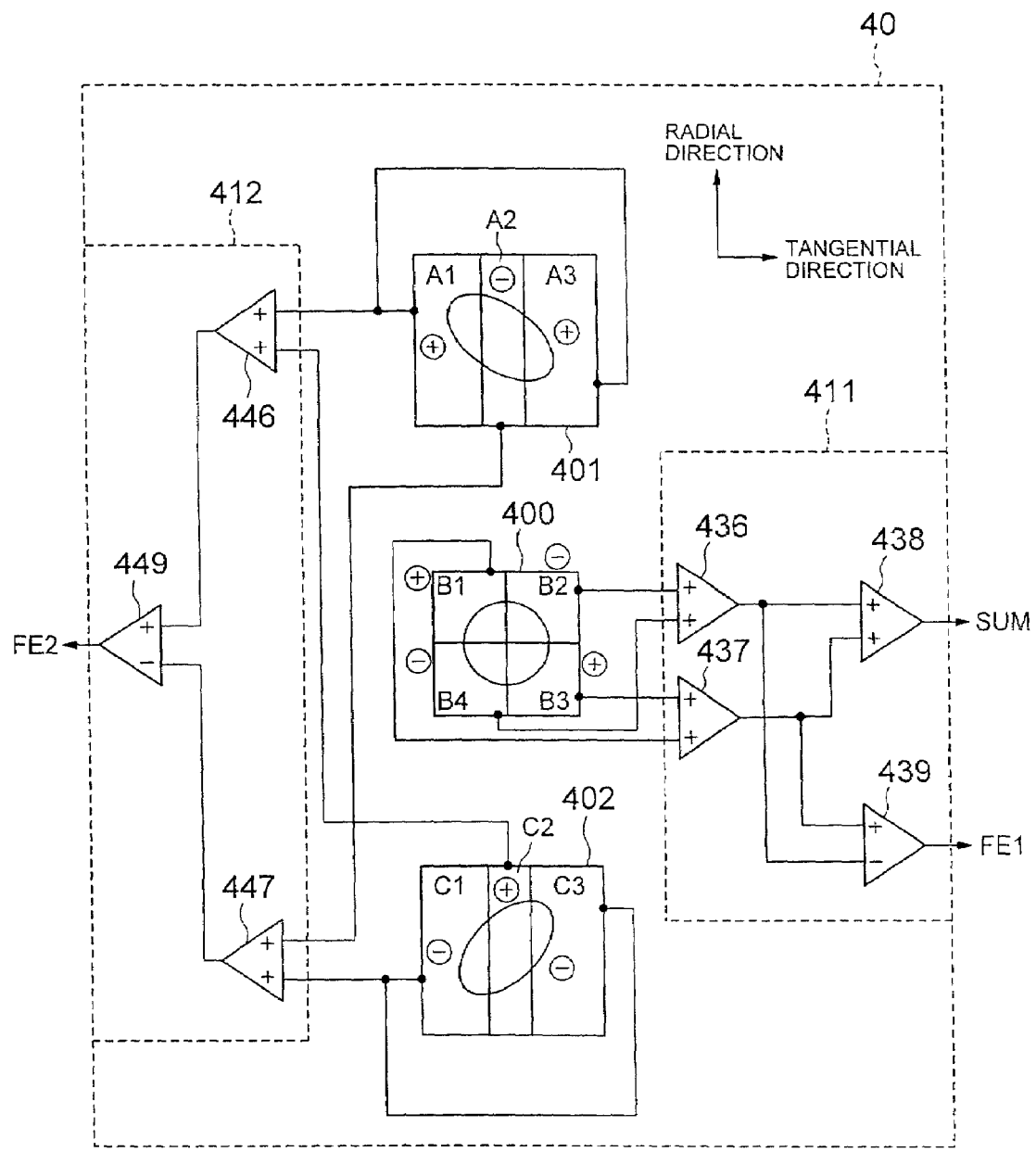
FIG. 4 is a schematic block diagram of the configuration of a photodetector in the optical pickup according to the present invention.

As shown in FIG. 4, in the photodetector 40, the 0-th order diffracted light photodetector 400 includes four equal area, light receiving portions (B1, B2, B3, B4) independent from each other and positioned in the vicinity of each other with two orthogonal dividing lines as the boundaries. One of the dividing lines is placed parallel to the extending direction of the track. The ±1st order diffracted light photodetectors 401 and 402 include three independent light receiving portions (A1, A2, A3) (C1, C2, C3), respectively positioned in the vicinity of each other with at least two dividing lines extending approximately parallel to the direction perpendicular to the extending direction of the track as the boundaries. The photodetector 40 is positioned so that the 0-th order diffracted light forms a circle of least confusion which will be described later when a light spot is in a focused state on the optical disc, and the circle is positioned at the intersection of the dividing lines of the 0th-order diffracted light photodetector 400. The light receiving portions are formed and positioned in point-symmetry with respect to the center (i.e., the intersection of the dividing lines) of the light receiving portions (B1, B2, B3, B4), in other words, in symmetry with respect to straight lines extending from the center in the track direction and the perpendicular direction, respectively.

Figure 12:
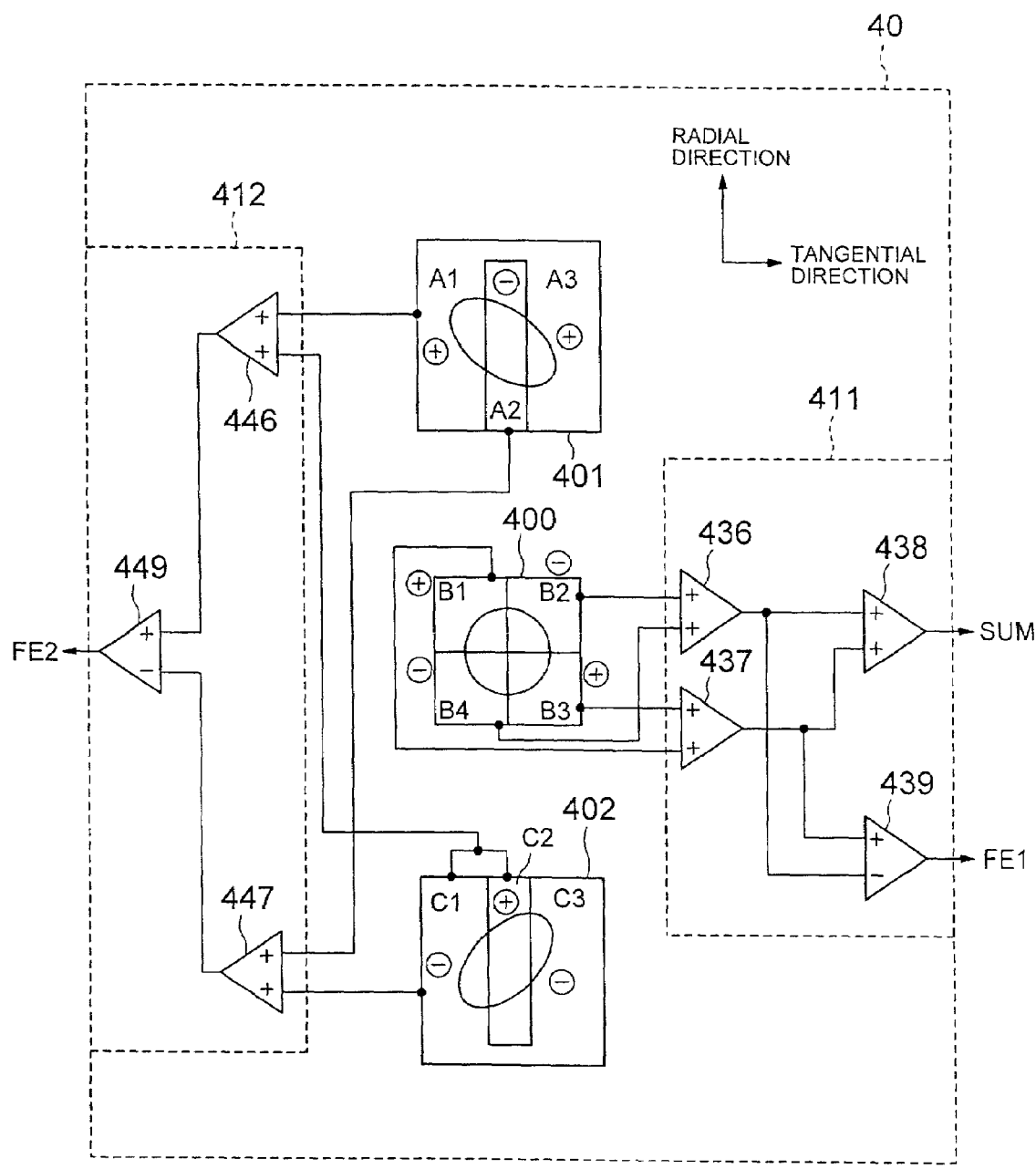
FIG. 12 is a schematic block diagram of the configuration of a photodetector in an optical pickup according to another modification of the embodiment.

Note that the light receiving portions in the ±1st-order diffracted light photodetectors may be at least two independent light receiving portions, and as shown in FIG. 12, the light receiving portions A1 and A3, and light receiving portions C1 and C3 may be connected rather than being independent.

Optical Path of Optical Pickup

As shown in FIG. 3, a light beam emitted from the semiconductor laser 31 comes into the polarization beam splitter 33 through the grating 32. The polarization beam splitter 32 includes a polarizing mirror. The incident light beam passes through the polarization beam splitter 33 and then the collimator lens 34. The optical path of the light beam, then, is changed perpendicularly by the mirror 35, passes through the ¼ wavelength plate 36, and is irradiated upon the information recording plane of the optical disc 1 by the objective lens 37. Thus, in the irradiation optical system, the objective lens 37 focuses a light beam on a series of pits or a track helically or concentrically arranged on the optical disc 1, and forms a light spot on the recording plane. With the irradiation light beam in a form of a spot, recording information is written/read to/from the information recording plane of the optical disc.

Return light reflected from the recording plane of the optical disc is guided to the photodetectors by the photodetection optical system. More specifically, the return light is incident again into the polarization beam splitter 33 through the objective lens 37, the ¼ wavelength plate 36, the mirror 35 and the collimator lens 34. In this instance, the return light has its optical path changed by the polarization beam splitter 33 toward a direction other than toward the semiconductor laser 31, and is guided to the astigmatism generating optical element 38 and the diffraction optical element 39. The return light passed through the astigmatism generating optical element 38 and the diffraction optical element 39 is provided with astigmatism, diffracted, and then let into the 0-th order diffracted light photodetector 400 and ±1st order diffracted light photodetectors 401, 402 in the photodetector 40 as diffracted light. Note that the return light may be provided with astigmatism after the diffraction by arranging the astigmatism generating optical element 38 and the diffraction optical element 39 in the reversed order. The light receiving portions in the photodetector 40 each photoelectrically convert the received light and output a resulting photodetection electrical signal which is subjected to a predetermined operation by the servo-signal generating operation circuit and a focus error signal is generated.

Function of Photodetection Optical System

Figure 5:
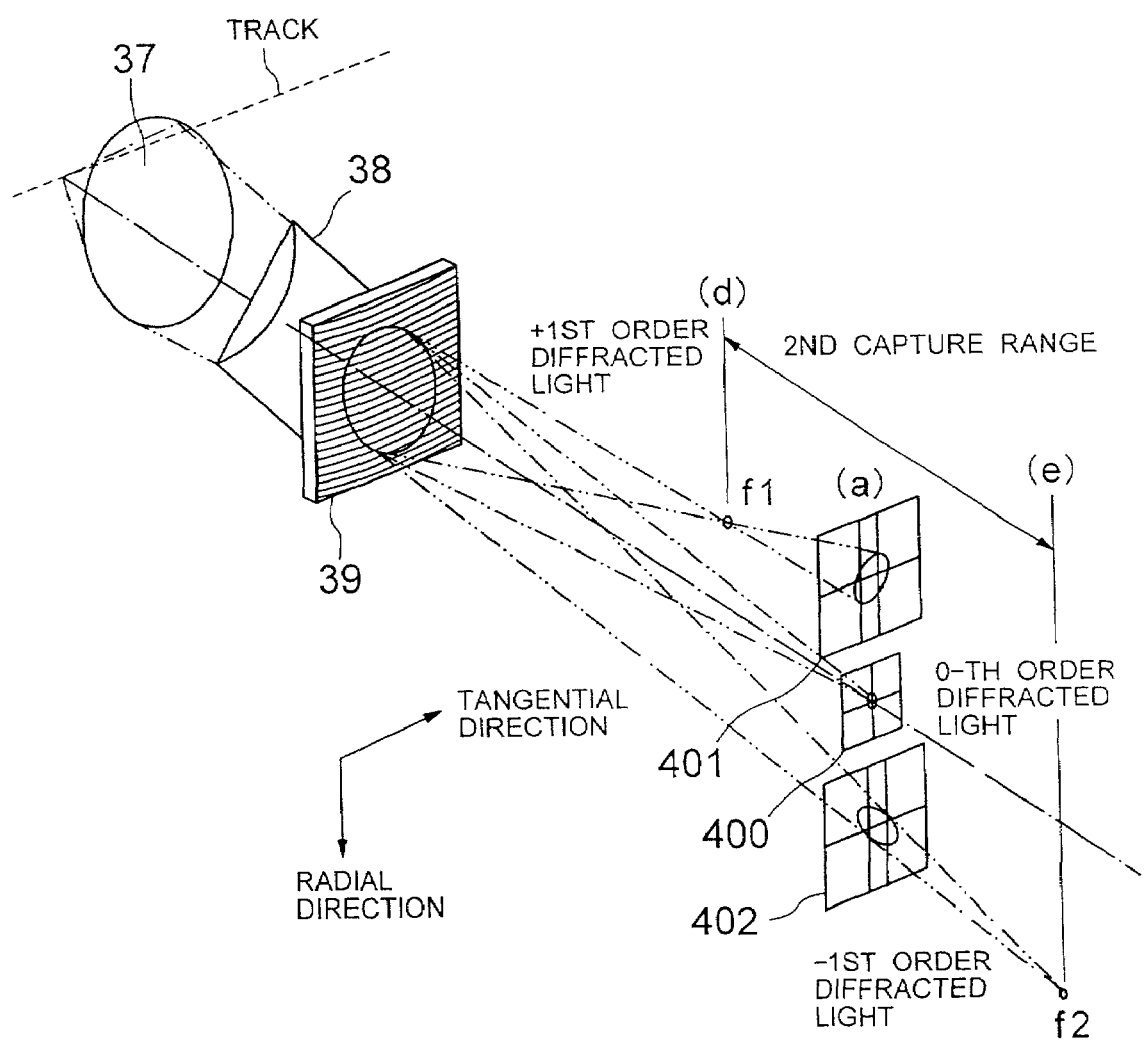
FIG. 5 is a schematic perspective view of the configuration of a photodetection optical system.

The holographic lens as the diffraction optical element 39 has an eccentric lens effect which allows the ±1st order diffracted light to be deflected from the original optical axis in approximate symmetry and condensed. The lens also serves as a convex or concave lens to any of the ±1st order diffracted light. As a result, as shown in FIG. 5, when a light beam is in a focused state on the track of the optical disc, the 0-th order diffracted light forms a focal point (at (a) in FIG. 5) by the diffraction optical element 39, assuming that there is not the astigmatism generating optical element 38. At the same time, the +1st order diffracted light forms a focal point f1 apart from the optical axis and before the photodetector 40 and the −1st order diffracted light forms a focal point f2 apart from the optical axis and ahead of the photodetector 40. The distance between the focusing points of ±1st order diffracted light, in the other words the distance between (d) and (e) shown in FIG. 5 corresponds to the capture range of the focus error signal.

As shown in FIG. 5, the ±1st order diffracted light of the return light provided with astigmatism by the cylindrical lens 38 which serves as the astigmatism generating optical element forms light spots having approximately equal areas in the vicinity of the center of the ±1st order diffracted light photodetectors 401, 402 (A2 and C2 in FIG. 4). Note that the diffraction optical element 39 of the holographic lens is set so that the 0-th order diffracted light has a greater quantity of light than the ±1st order diffracted light. This is for the purpose of setting the output of the 0-th order diffracted light photodetector 400 to be larger than those of the ±1st order diffracted light photodetectors 401, 402.

The 0-th order diffracted light is not affected by the holographic lens of the diffraction optical element 39, and therefore advances without being shifted from the original optical axis. For the 0-th order diffracted light only, the system operates exactly in the same manner as a detection optical system using an astigmatism method. More specifically, as shown in FIG. 6, the 0-th order diffracted light of the return light having astigmatism provided by the cylindrical lens 38 in the astigmatism generating optical element forms a light spot (the circle of least confusion as will be described) in the vicinity of the center of the four-segment, 0-th order diffracted light photodetector 400 having four light receiving plane segments divided by two orthogonal lines in the track direction and the radial direction of the disc.

Figure 6:
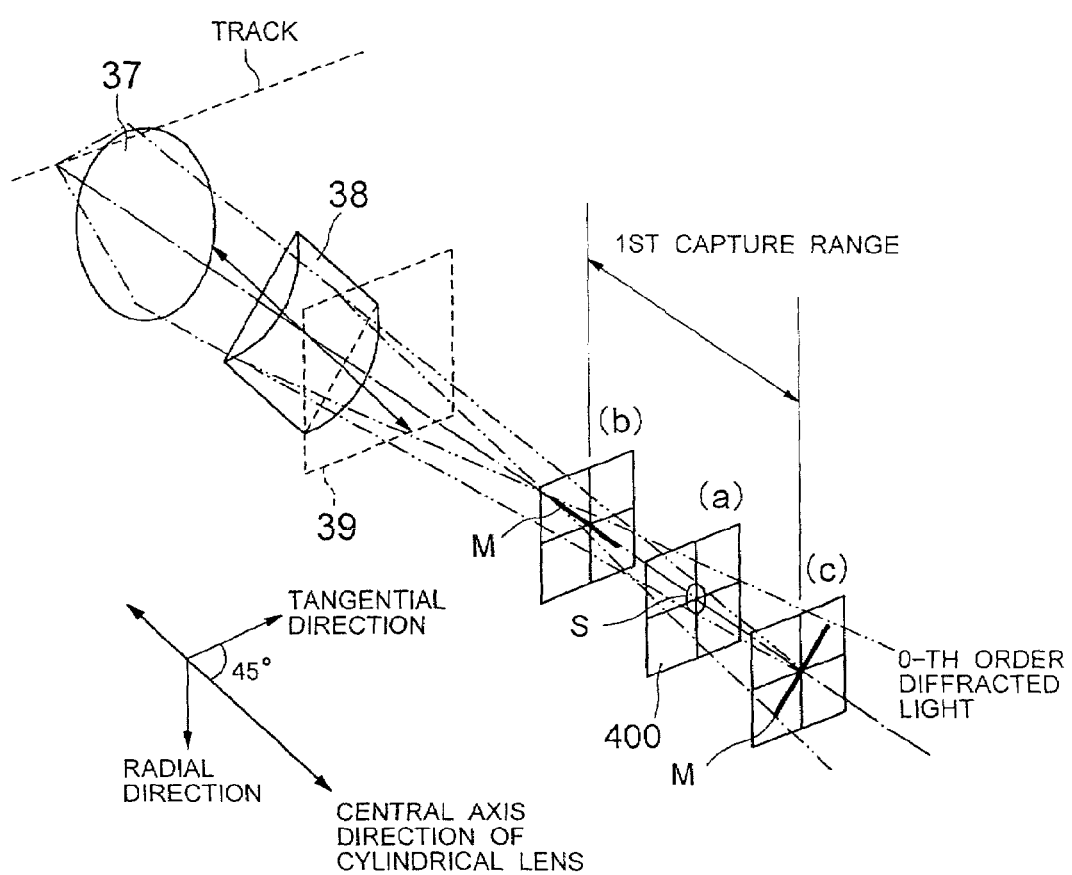
FIG. 6 is a schematic perspective view of the configuration of a photodetection optical system.

As shown in FIG. 6, the cylindrical lens 38 is positioned in the optical path of the return light so that its central axis (the axis of rotation symmetry of the cylindrical surface forming a lens surface) extends at an angle of 45° with respect to the track extending direction of the optical disc. In this arrangement, the return light converged by the objective lens 37 is provided with astigmatism. With this arrangement, a line image M, a circle of least confusion B and a line image S are formed depending on the distance between the optical disc and the objective lens 37. Therefore, the detection optical system irradiates the circle of least confusion B at (a) in FIG. 6 to the 0-th order diffracted light photodetector 400 when the light beam is in a focused state, and a line image and an elliptical light spot extending in a diagonal direction of the light receiving plane as shown at (b) or (c) in FIG. 6 in a defocus state. The distance between the line images of the 0-th order diffracted light, i.e., the distance between (b) and (c) in FIG. 5 corresponds to the capture range of the focus error signal. The capture range obtained by the 0-th order diffracted light photodetector 400 is referred to as "first capture range," while the range obtained by the ±1st order diffracted light photodetectors 401, 402 are referred to as "second capture range."

The operation of obtaining the first and second capture ranges using the 0-th and fist order diffracted light photodetectors 400, 401, 402 by the photodetection optical system including the holographic lens as the diffraction optical element 39 and the cylindrical lens 38 as the astigmatism generating element will be described.

Figure 7:
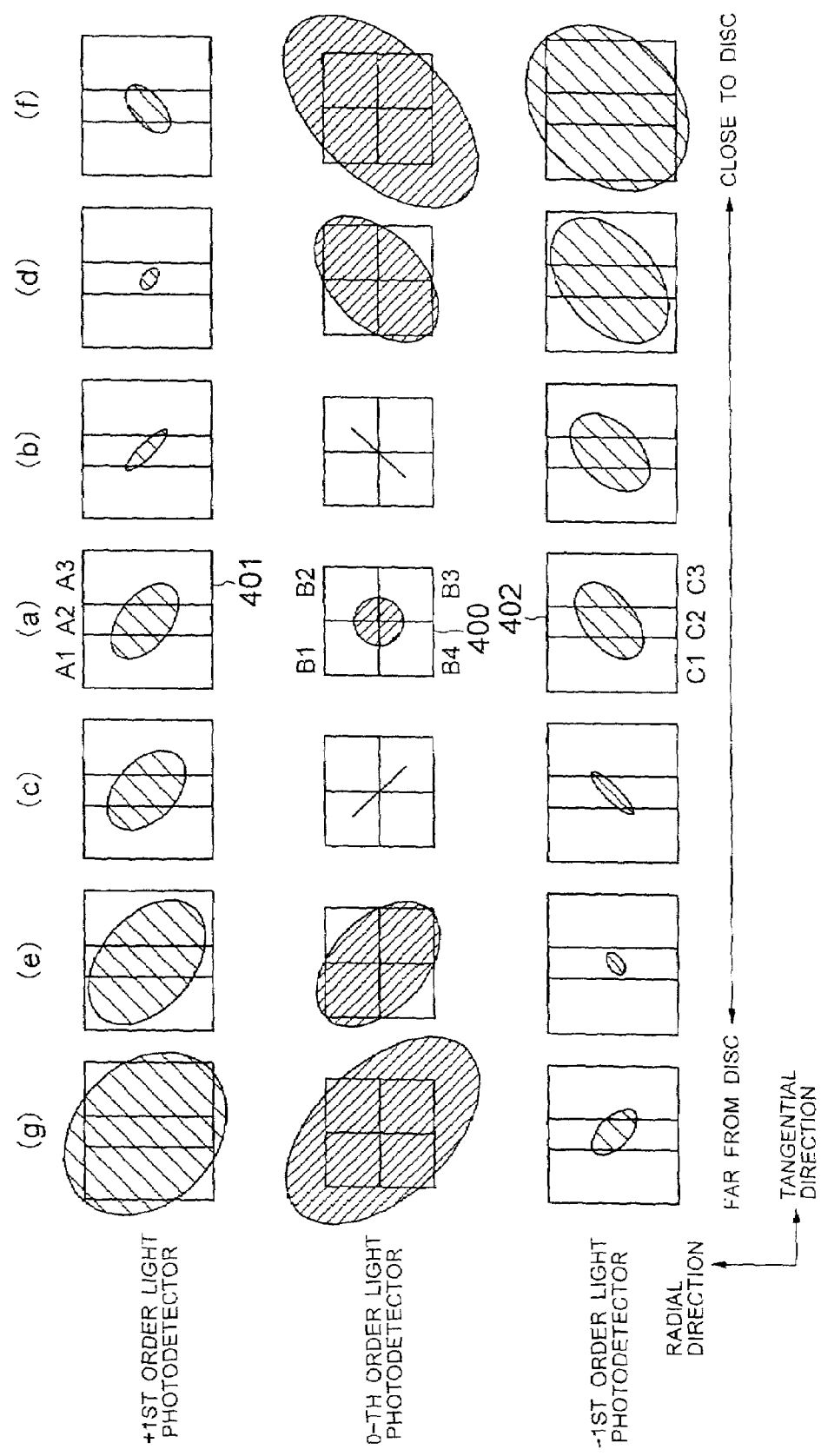
FIG. 7 is a schematic plan view of a photodetector in the optical pickup according to the first embodiment of the invention.

As shown in (a) of FIG. 7, the 0-th order diffracted light is condensed into the circle of least confusion on the 0-th order diffracted light photodetector 400, and at the same time the ±1st order diffracted light is condensed into ellipses of approximately equal areas extending in different diagonal directions on the ±1st order diffracted light photodetectors 401, 402, respectively.

When the optical disc 1 is closer to the objective lens 37 than the focused state position, as shown in (b) of FIG. 7, the 0-th order diffracted light forms a line image along a diagonal line, +1st order diffracted light is condensed into a reduced ellipse on the +1st order diffracted light photodetector 401, and −1st order diffracted light is condensed as an expanded ellipse on the −1st order diffracted light photodetector 402.

Meanwhile, if the optical disc 1 is farther from the objective lens 37 than the focused state position, as shown in (c) of FIG. 7, the 0-th order diffracted light forms a line image along the other diagonal line, the +1st order diffracted light is condensed into an expanded ellipse on the +1st order diffracted light photodetector 401, and the −1st order diffracted light is condensed into a reduced ellipse on the −1st order diffracted light photodetector 402.

As shown in (d) and (e) of FIG. 7, when the distance to the optical disc increases/decreases, the 0-th order diffracted light is condensed into an expanded ellipse on the 0-th order diffracted light diffracted light photodetector 400. As shown in (d) of FIG. 7, when the optical disc is closer, the +1st order diffracted light is condensed into an ellipse extended in the diagonal direction and having the smallest area on the ±1st-order diffracted light photodetector 401. At the time, the −1st order diffracted light is condensed into an even more expanded ellipse on the −1st order diffracted light photodetector 402. As shown in (e) of FIG. 7, when the optical disc is further, the +1st order diffracted light is condensed into an even more expanded ellipse on the +1st order diffracted light photodetector 401, and the −1st order diffracted light is condensed into an ellipse with the smallest area in the diagonal direction on the −1st order diffracted light photodetector 402.

As shown in (f) and (g) of FIG. 7, the distance to the optical disc increases/decreases, the 0-th order diffracted light forms an ellipse expanding beyond the 0-th order diffracted light photodetector 400. As shown in (f) of FIG. 7, when the optical disc is closer, the +1st-order diffracted light is condensed into an ellipse extending in the other diagonal direction on the +1st order diffracted light photodetector 401, while at the same time, the −1st order diffracted light is further condensed into an even more expanded ellipse. Meanwhile, if the optical disc is further, as shown in (g) of FIG. 7, the +1st order diffracted light is condensed into a more expanded ellipse, and at the same time, −1st order diffracted light is condensed into an ellipse further extending in the other diagonal direction on the −1st order diffracted light photodetector 402.

Therefore, the focus error signals, i.e., first and second focus error signals FE1 and FE2 having the first and second capture ranges are given by the following expressions (1) (astigmatism method) and (2) (spot size method), where the reference characters of the light receiving portions in the 0-th order diffracted light photodetector 400 and the ±1st order diffracted light detectors 401, 402 represent their outputs.

$$FE1=(B1+B3)-(B2+B4) \quad (1)$$

$$FE2=(A1+A3+C2)-(A2+C1+C3) \quad (2)$$

The first and second focus error signals can be generated so that the first and second capture ranges are different from each other.

Servo-signal Generating Operation Circuit

As shown in FIG. 4, the 0-th order diffracted light photodetector 400 is connected to a servo-signal generating operation circuit 411 for the 0-th order diffracted light, and the circuit 411 generates the first focus error signal FE1 having the first capture range based on the output signal of the 0-th order diffracted light photodetector 400. The ±1st order diffracted light photodetectors 401, 402 are connected to a servo-signal generating operation circuit 412 for the ±1st order diffracted light, and the circuit 412 generates the second focus error signal FE2 having the second capture range based on the output signals of the servo-signal generating operation circuits 401, 402 for the ±1st-order diffracted light.

The servo-signal generating operation circuit 411 for the 0-th order diffracted light includes addition circuits 436, 437, and 438, and a subtraction circuit 439. The subtraction circuit 439 performs subtraction between the output signals of the addition circuits 436 and 437 ((B1+B3)−(B2+B4)), and based on the output, the first focus error signal FE1 is generated. Note that both outputs of the addition circuits 436 and 437 resulting from the addition of the photoelectric conversion signals of the light receiving portions (B1+B3) and (B2+B4), which are positioned in point symmetry with respect to the light receiving center on the light receiving plane of the photodetector 400, are added by the addition circuit 438 to generate a focus sum signal SUM. The focus sum signal SUM is transmitted as an RF (Radio Frequency) signal to a read signal processing system (not shown) via an RF amplifier and an equalizer (both not shown). The read signal processing system reproduces a final audio or video signal or a computer data signal from the RF signal, and the reproduced signal is transmitted, for example, to the external device of the apparatus. The photoelectric conversion signals of the light receiving portions (B1+B2) and (B3+B4) divided by the tangential dividing line are generated and used as tracking error signals.

As shown in FIG. 4, the servo-signal generating operation circuit 412 for the ±1st order diffracted light includes addition circuits 446 and 447, and a subtraction circuit 449. The subtraction circuit 449 performs subtraction between the output signals of the addition circuits 446 and 447 ((A1+A3+C2)−(A2+C1+C3)), and based on the output, the second focus error signal FE2 is generated.

The output depending upon the size of the condensed spot on the photodetector as shown in FIG. 7 is obtained by the operations, so that the first focus error signal FE1 according to the astigmatism method and the second focus error signal FE2 according to the differential spot size method can be provided. The ±1st order diffracted light photodetectors 401 and 402 are used only for detecting the second focus error signal FE2 and not for detecting the tracking error signal or the RF signal. The second capture range of the second focus error signal FE2 can be set substantially independently from the first focus error signal FE1 by setting the focal length of the holographic lens. The second capture range can be set larger than the capture range of the first focus error signal FE1, and therefore the resulting focus error signal can be used as a focus error signal with an improved focus servo setting characteristic.

A larger quantity of light is distributed for the 0-th order diffracted light which requires a broad bandwidth and an S/N. Therefore, the holographic lens 39 is set so that the 0-th order diffracted light has a greater quantity of light than the 1st order diffracted light. The ±1st order diffracted light used only for generating the focus error signal does not require a large signal bandwidth or S/N.

Focus Servo Loop Control

Figure 8:
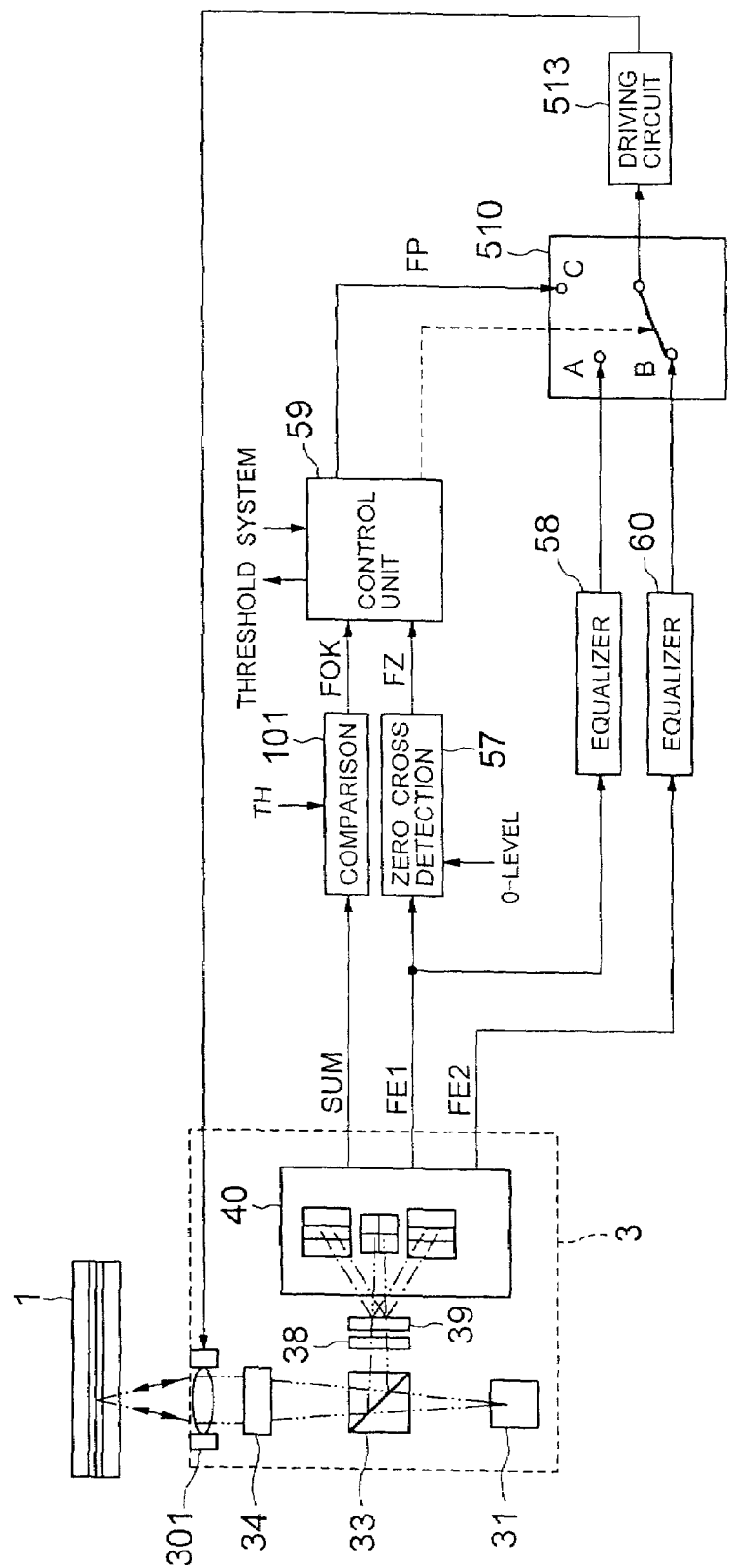
FIG. 8 is a schematic block diagram of an optical pickup according to the present invention.

As shown in FIG. 8, the focus error signal FE1 obtained by the subtraction circuit 439 serving as an output stage of the optical pickup 3 is amplified by an amplifier (not shown) and supplied to a zero-cross detection circuit 57 and an equalizer 58.

The zero-cross detection circuit 57 detects the first focus error signal FE1 attaining a predetermined level, a zero level according to the embodiment, to generate a zero-cross detection signal FZ based on the result of detection for supply to a control unit 59. The control unit 59 is a microcomputer, which includes a processor, a ROM and a RAM, receives commands from a system controller and stores predetermined threshold values. The equalizer 58 equalizes the waveform of the supplied focus error signal FE1 and supplies the equalized, first focus error signal FE1 to one input terminal (A) of a switch circuit 510.

The second focus error signal FE2 obtained by the subtraction circuit 449 which serves as the other output stage of the optical pickup 3 is amplified by an amplifier (not shown) and supplied to an equalizer 60. The equalizer 60 equalizes the waveform of the supplied signal FE2, and supplies the equalized, second focus error signal FE2 to another input terminal (B) of the switch circuit 510.

The input terminal (C) of the switch circuit 510 is provided with a forcing signal FP and a control signal from the system control unit 59, and switching control is performed to selectively output from (A) to (C) in response to the control signal. When the control signal instructs the focus servo loop to be closed, one focus error signal from an equalizer is selected for output to a driver amplifier 513. Meanwhile, when the control signal instructs the loop to be open and a focus actuator 301 to be forcibly driven, the forcing signal FP from the control unit 59 is selected for output to the driver amplifier 513.

The control unit 59 performs various control and processing in the player. The unit for example performs processing corresponding to a focus setup operation mode.

In the setup operation mode processing, the level of the signal SUM is compared to a threshold level TH supplied from the control unit 59 using a comparator 101 and when the level is beyond the threshold level, a focus servo activation permission signal FOK rendered significant only when the threshold level is passed is output to the control unit 59. The control unit 59 detects the completion of the setup of the read signal processing system and the focus servo system in response to the received focus servo activation permission signal FOK and starts the servo control while retaining the setting of the focus servo control at the time.

The output signal of the switch circuit 510 is supplied to the driver amplifier 513. The driver amplifier 513 generates a driving signal based on the output of the switch circuit 510, and supplies the generated signal to the focus actuator 301. Thus, in the focus servo loop closed state in which the switch circuit 510 selects one input and relays the output signal of the equalizer 58 or 60 to the driver amplifier 513, the focus actuator 301 is driven so that the focus error signal attains a zero level, in other words, the focused position of the light beam follows the recording plane. Meanwhile, in the focus servo loop open state in which the switch circuit 510 selects the other input and only the forcing signal FP is relayed to the driver amplifier 513, the focus actuator 301 is driven so that the focused position of the light beam is forcibly moved toward/apart from a target recording plane in response to the forcing signal FP.

The processing in the focus setup operation in the operation with a multi-layer optical disc executed by the control unit 59 will be now described in detail by way of illustration.

In step 1, the switch circuit 510 is selectively switched to the input terminal C in response to a focus search signal output from the control unit 59, and a triangular wave signal generated by the control unit 59 is input to the driver amplifier 513. The signals detected by the photodetectors are operated using the servo-signal generating operation circuits, and the first and second focus error signals FE1 and FE2 are input to the focus servo control circuit.

In step 2, the focus error signal FE1 is used to determine whether the disc is a single layer optical disc or a multi-layer optical disc. The optical disc is determined for example based on the number of zero-cross points of the first focus error signal FE1 detected by the zero-cross detection circuit 57. The control unit 59 determines that the disc is a multi-layer optical disc when the first focus error signal has more than one zero-cross points.

In step 3, the switch circuit 510 is switched to the input terminal B and the second focus error signal FE2 is input to the driver amplifier 513.

In step 4, after lock-in is confirmed, the switch circuit 510 is switched to the input terminal A, and the first focus error signal FE1 is input to the driver amplifier 513.

In step 5, when the disc is determined to be a multi-layer optical disc in the step 2, the switch circuit 510 is switched to the input terminal C and a focus jump signal is input to the driver amplifier 513. When the disc is a single-layer optical disc, the process directly proceeds to the next operation.

In step 6, the switch circuit 510 is switched to the input terminal B, and the second focus error signal is input to the driver amplifier 513. The focus jump to the nearest recording layer is completed, and the process proceeds to the next operation.

Modification of the Embodiment

In the above-described embodiment, in the 0-th order diffracted light photodetector 400, an area of the light receiving portions (B1, B3) having the positive polarity and an area of the light receiving portions (B2, B4) having the negative polarity connected to the servo-signal generating operation circuit 411 for the 0-th order diffracted light are approximately equal, and the light receiving portions (A1, A3) (C1, C3) are symmetrically arranged with respect to the central light receiving portions (A2) (C2) in the ±1st order diffracted light photodetectors 401, 402.

Figure 9:
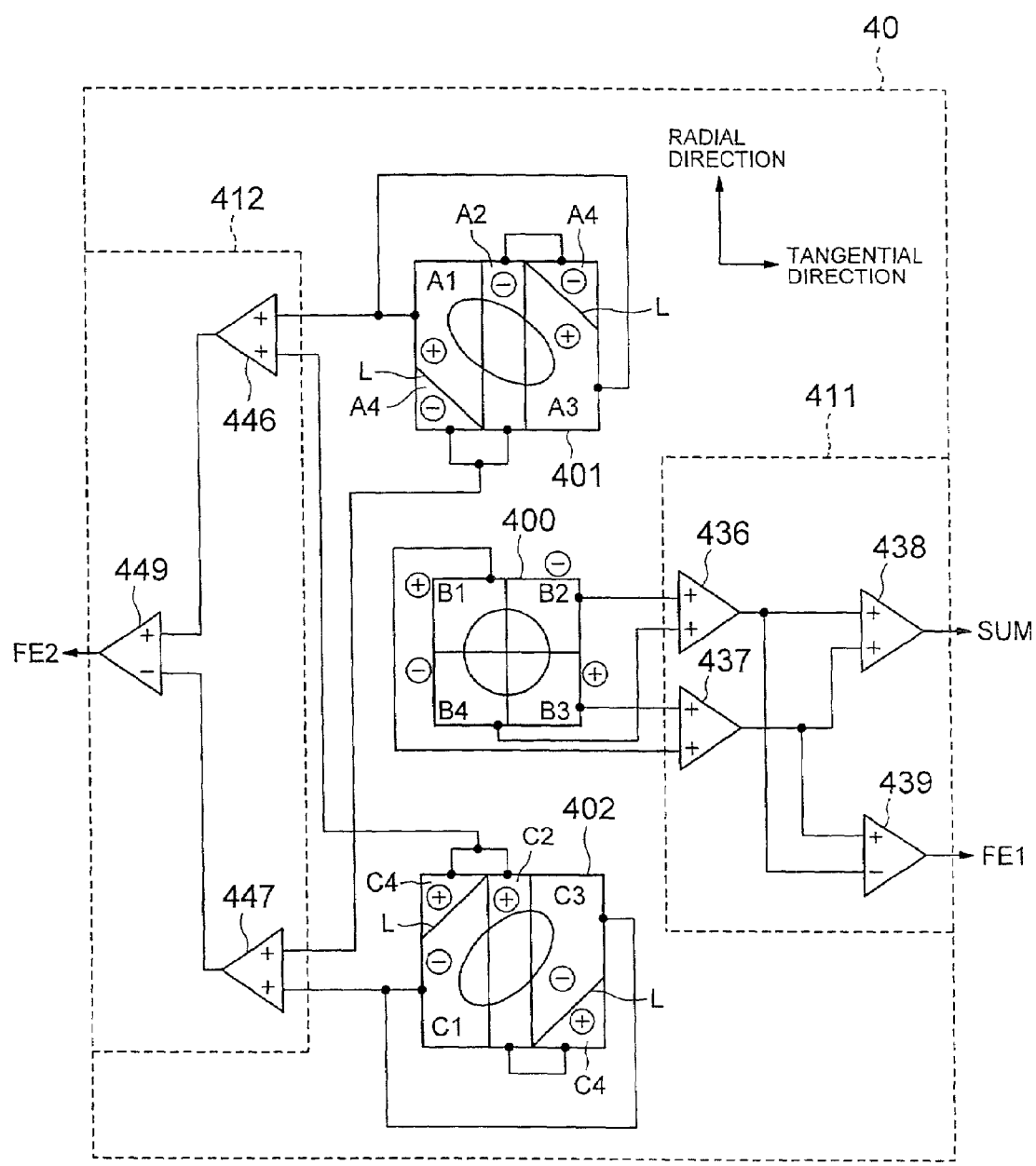
FIG. 9 is a schematic block diagram of the configuration of a photodetector in an optical pickup according to a modification of the embodiment.

In a modification of the embodiment, as shown in FIG. 9, in the ±1st order diffracted light photodetectors 401, 402, an area of the light receiving portions (A1, A3) (C2) having the positive polarity and an area of the light receiving portions (A2), (C1, C3) having the negative polarity connected to the servo-signal generating operation circuit are approximately equal. In other words, the area of the light receiving portions (A1, A3) in the +1st-order diffracted light photodetector 401 is divided by a dividing line L along the longer axis (the diagonal direction) of the elliptical spot of the +1st order diffracted light and reduced by the area of the sub portion A4. Both sub portions A4 are connected to the light receiving portion A2 to increase the area of the light receiving portion A2, so that the areas of the light receiving portions having the positive and negative polarities are set approximately equal. Similarly, the area of the light receiving portions (C1, C3) in the −1st-order diffracted light photodetector 402 is divided by a dividing line L along the longer axis (the diagonal direction) of the elliptical spot of the −1st-order diffracted light and reduced by the area of the sub portion C4. Both sub portions C4 are connected to the light receiving portion C2 to increase the area of the light receiving portion C2, so that the areas of the light receiving portions having the positive and negative polarities are set approximately equal.

Figure 10:
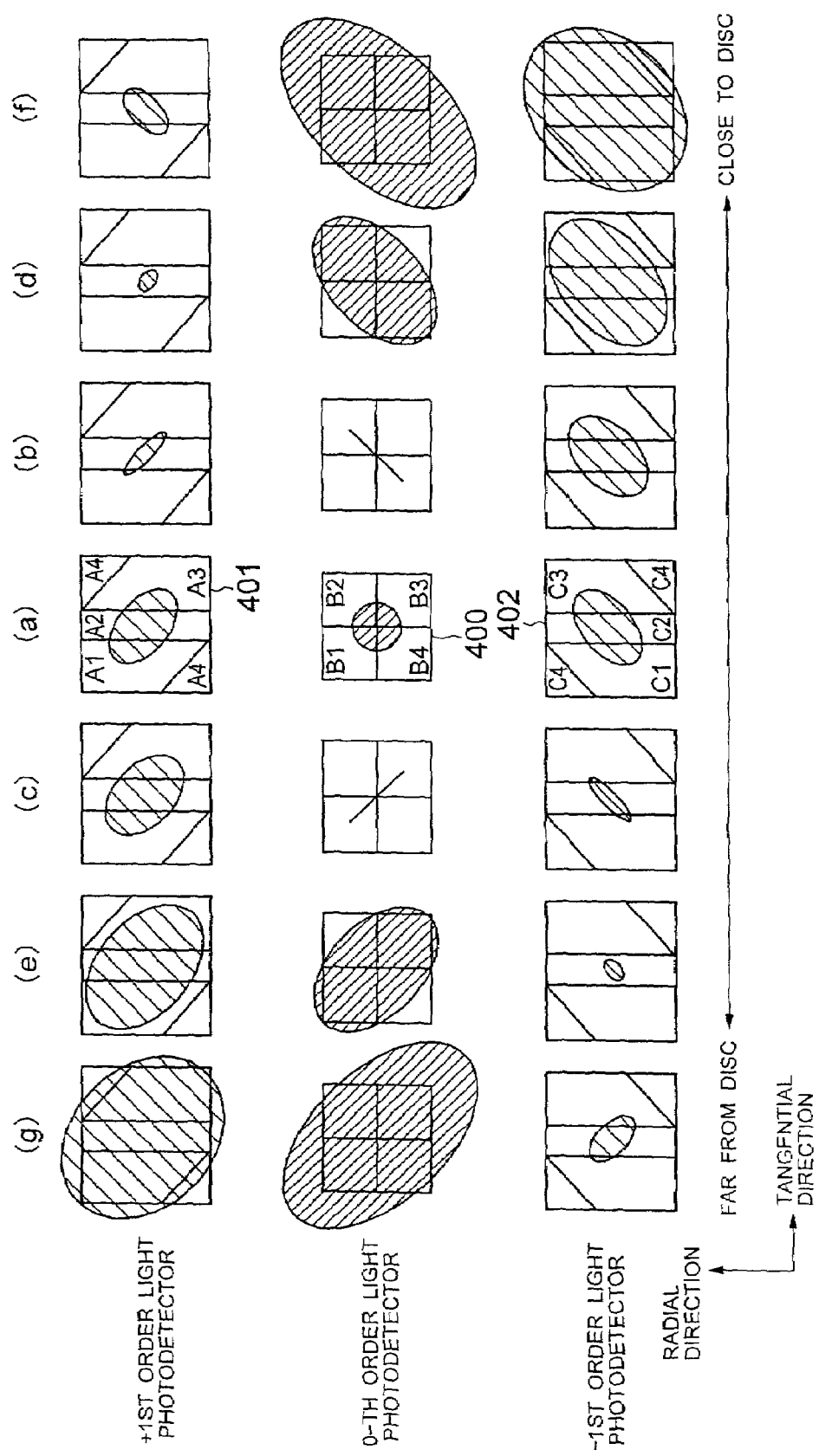
FIG. 10 is a schematic plan view of a photodetector in an optical pickup according to the modification of the embodiment.

Thus, the offset of the focus error signals in a defocus state can be reduced. More specifically, as shown in FIG. 10, in the modification of the embodiment, the same operation for the arrangement shown in FIG. 7 is performed for the 0-th order diffracted light photodetector 400. For the ±1st order diffracted light photodetectors 401, 402, as can be seen from (d) and (e) of FIG. 10, the same operation is performed until the states shown in (d) and (e) of FIG. 7 are provided.

After the states shown in (d) and (e) of FIG. 10, when the ±1st order diffracted light spots start to expand beyond the areas of the ±1st order diffracted light photodetectors 401 and 402, the absolute value of the second focus error signal FE2 starts to decrease. As shown in (f) of FIG. 10, as the optical disc is closer and a greater defocus state is attained, the −1st order diffracted light outside the light receiving portions (C1, C3) comes into both adjacent sub portions C4. Thus, the opposite polarity component increases, and therefore the curve of the second focus error signal FE2 operated by the above expression (2) more abruptly decreases to zero right after the second capture range is passed than the curve of the second focus error signal FE2 without the adjacent sub portions C4.

As shown in (g) of FIG. 10, if a great defocus state is attained in the direction in which the optical disc 1 moves away from the objective lens 37, the +1st-order diffracted light outside the light receiving portions (A1, A3) comes into both adjacent sub portions A4. Thus, the opposite polarity component increases, and therefore similarly to the case when the optical disc is closer, the curve of the second focus error signal FE2 operated by the above expression (2) more abruptly decreases to zero right after the second capture range is passed than the curve of the second focus error signal FE2 without the adjacent sub portions A4.

By changing the shape of the sub portions A4 and C4 in the light receiving portions or the distance therebetween, the manner of convergence to zero changes in a region outside the second capture range, and therefore the shape or distance can be optimized to allow the second focus error signal characteristic with mild convergence to zero to be abruptly converged to zero according to the modification. Therefore, a multi-layer disc with a small layer interval can be reproduced with a sufficiently smaller offset in the focus error signal in each layer, and the detection sensitivity changes little, so that normal focus servo control can be achieved.

Figure 13:
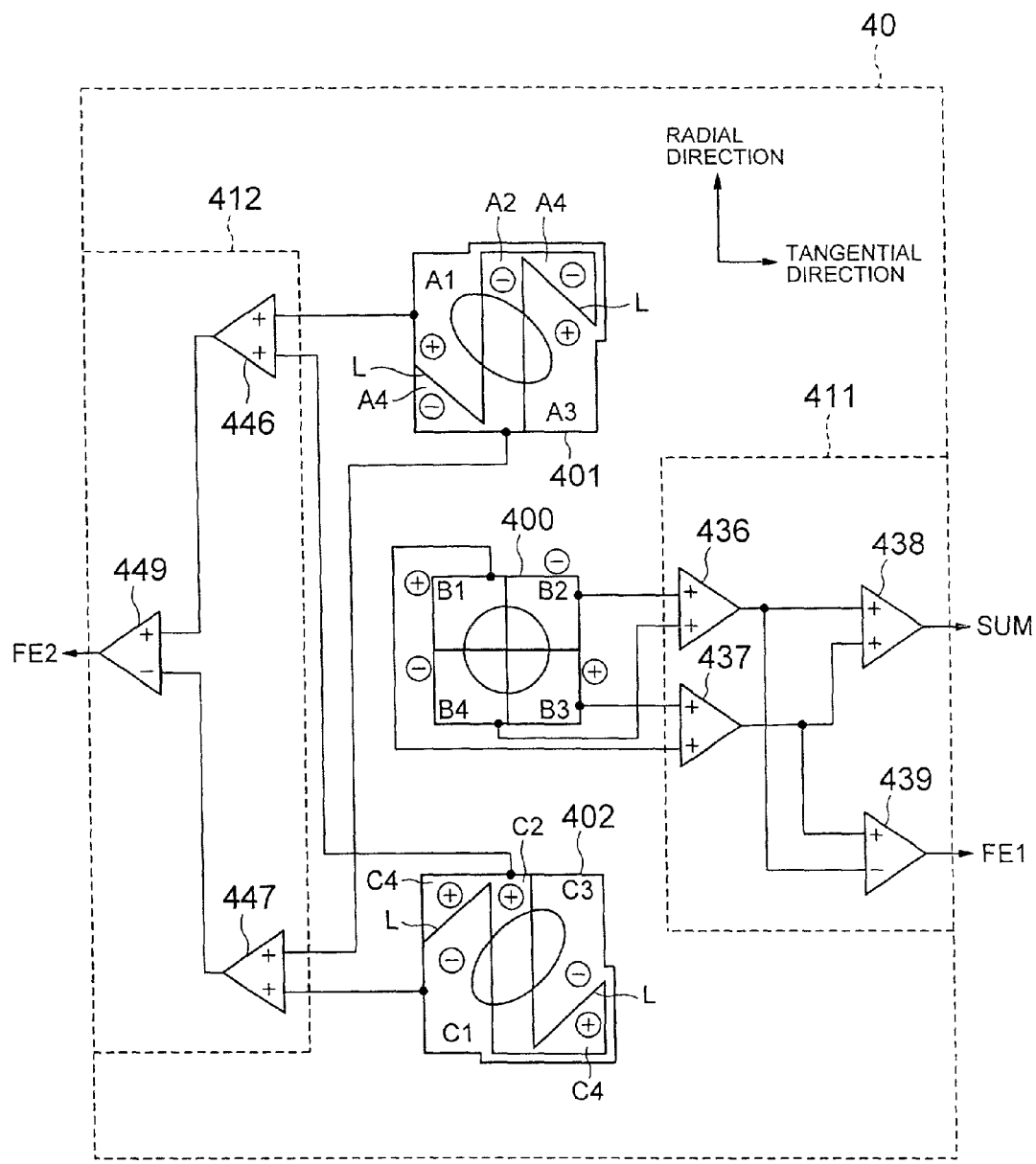
FIG. 13 is a block diagram of the configuration of a photodetector in an optical pickup according to another modification of the embodiment.

Note that the light receiving portions in the ±1st order diffracted light photodetectors need only include at least two independent light receiving portions, and therefore as shown in FIG. 13, the light receiving portions A1 and A3 and C1 and C3 may be connected rather than being independent from one another.

Figure 11:
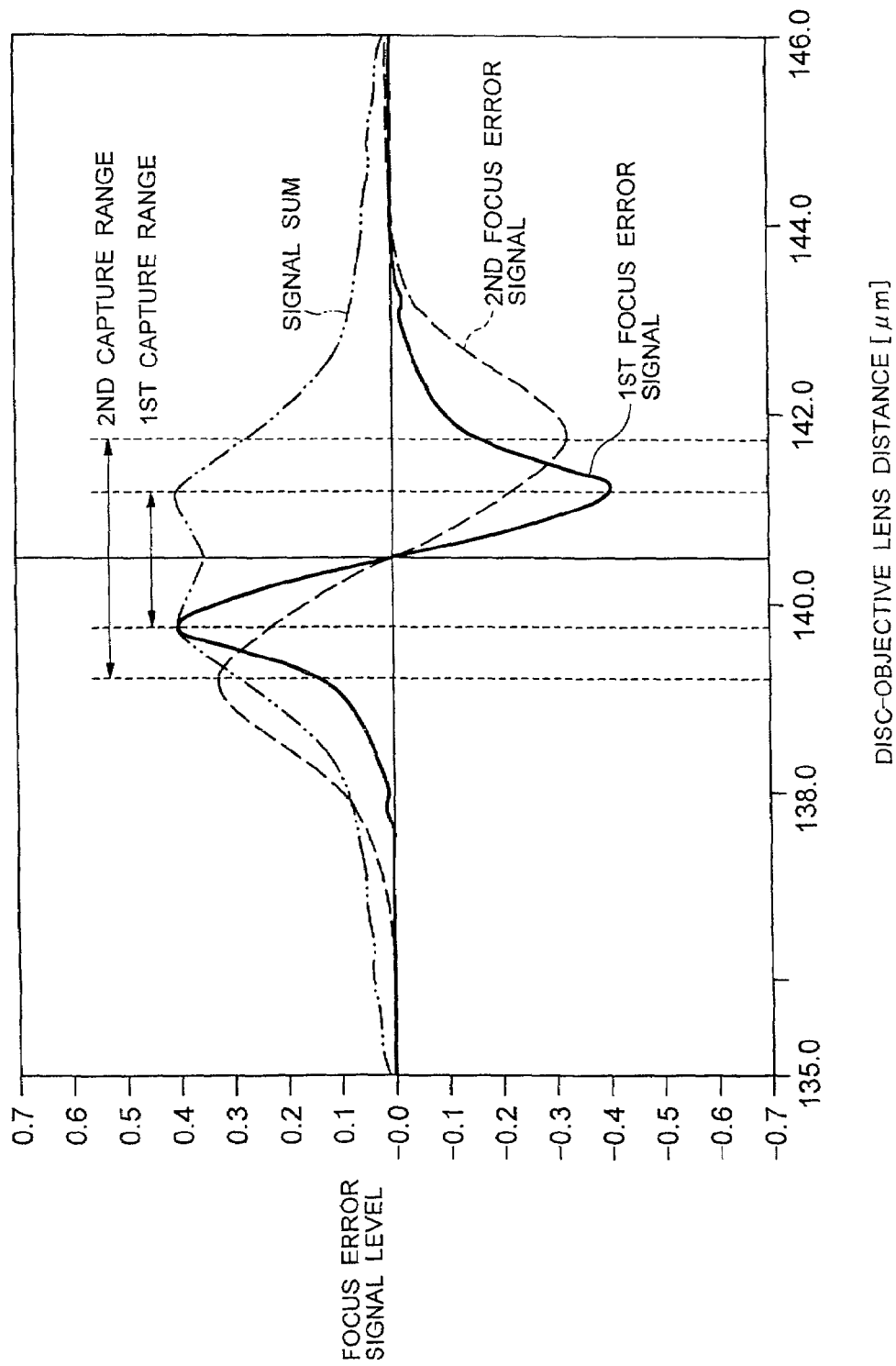
FIG. 11 is a graph showing first and second focus error signal characteristics and an signal SUM changing based on the distance between an optical disc and an objective lens in an optical pickup according to the present invention.

FIG. 11 shows the first and second focus error signal characteristics and the signal SUM changing based on the distance between the optical disc and the objective lens using the optical pickup according to the modification.

Meanwhile, when the present invention is applied to a three-beam pickup such as DPP and CTC, although ±1st order diffracted light is generated in a side beam, the quantity of the ±1st diffracted light in the side beam is insignificant, and therefore a photodetector for receiving the light is not necessary. The three-beam photodetector receives only the 0-th order diffracted light by the above diffraction optical element.

According to the present invention, the first focus error signal according to the astigmatism method and the second focus error signal according to the differential spot size method can be provided. The capture range of the second focus error signal may be set larger than the capture range of the first focus error signal. Therefore, using the second focus error signal having a wide capture range, stable setting operation can be performed in a multi-layer optical disc for example, while using the first focus error signal having a narrow capture range unaffected by interlayer crosstalk, interlayer jump or focus servo control in each layer can be performed.

When reproducing a land/groove optical disc, only the second focus error signal is used, so that stable focus servo control unaffected by track cross noises can be achieved. In this instance, much allowance is not necessary for the size of the photodetector, in other words, the size of the photodetector may be reduced since the first focus error signal is not used. The bandwidth can be readily widened with a small size photodetector. In addition, the use of the small size photodetector for reproducing information from a multi-layer optical disc allows interlayer crosstalk in a reproduced signal to be restrained to a low level.

In the ±1st order diffracted light photodetectors, the areas of the light receiving portions connected to the servo-signal generating operation circuit having the positive polarity and the negative polarity are approximately equal, and therefore offsets of the focus error signal in a defocus state can be reduced.

Second Embodiment

A recording/reproducing apparatus including an optical pickup according to a second embodiment of the present invention will be described.

Irradiation Optical System in Optical Pickup

Figure 1:
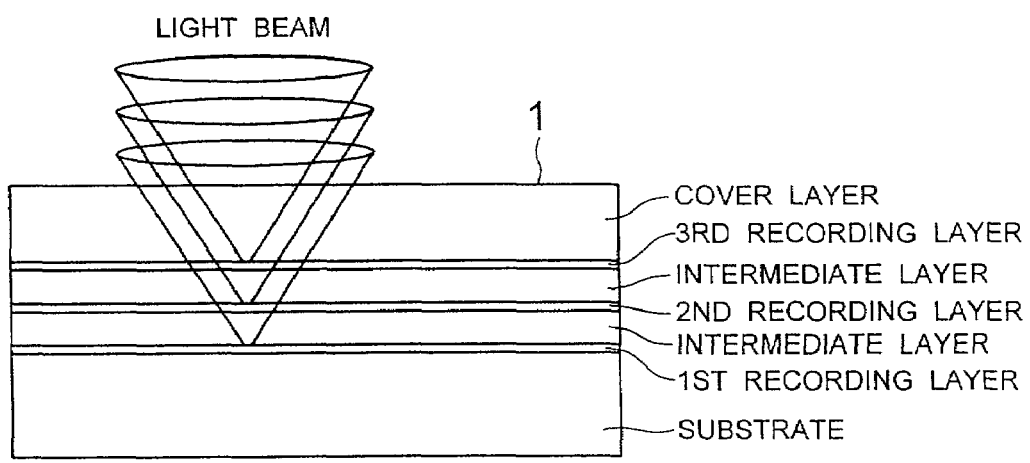
FIG. 1 is a schematic sectional view of a three-layer optical disc.
Figure 14:
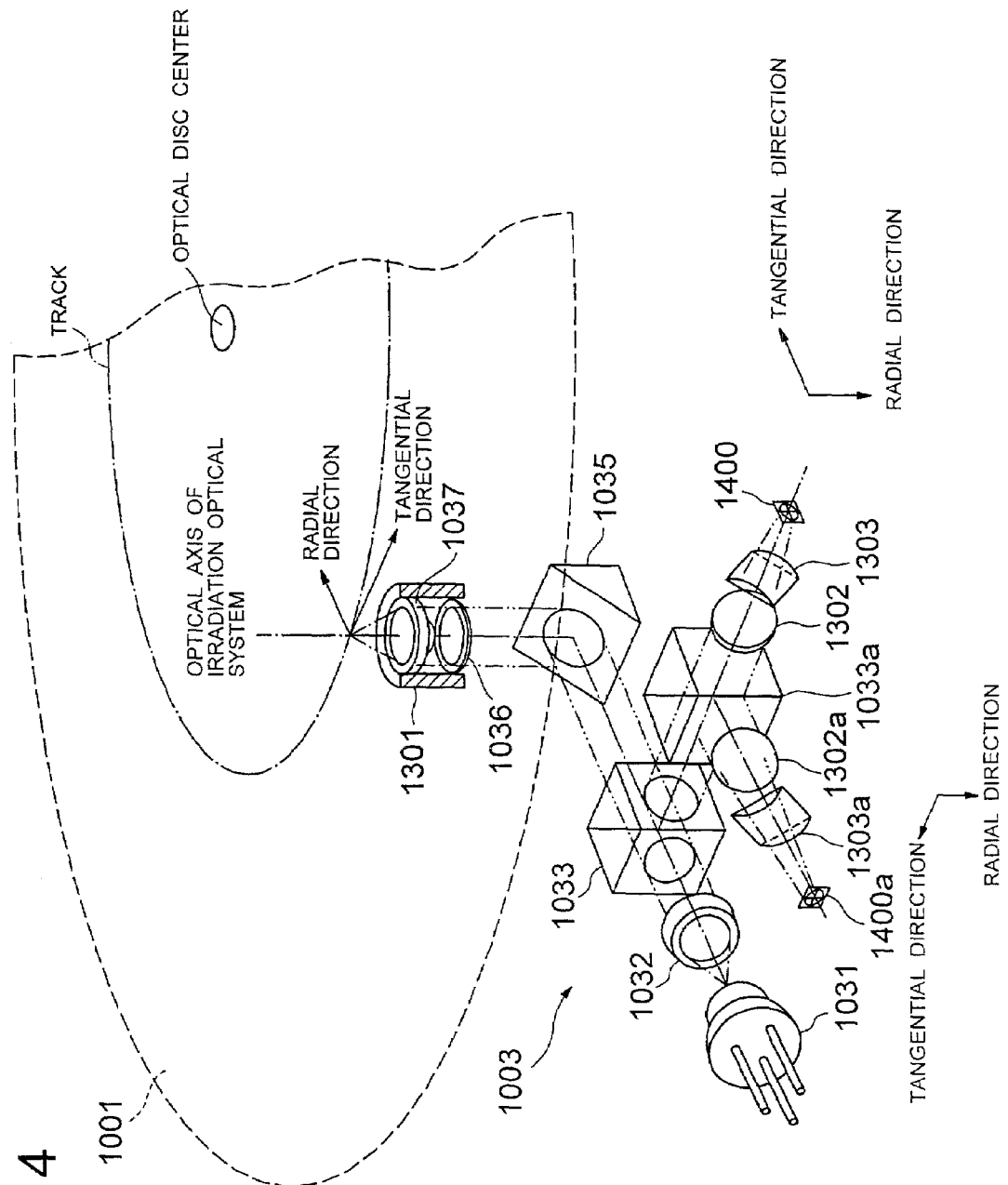
FIG. 14 is a schematic perspective view of the configuration of an optical pickup according to one embodiment of the present invention.

FIG. 14 is a view showing the configuration of an optical pickup 1003 according to a second embodiment of the present invention. A multi-layer disc such as an optical disc 1001 having three recording layers as shown in FIG. 1 is placed on the turntable and apart from an objective lens 1037 in the optical pickup 1003. The turntable is rotated by a spindle motor (not shown)

The optical pickup 1003 includes an irradiation optical system including a semiconductor laser 1031 as a light source, a collimator lens 1032, a polarization beam splitter 1033, a mirror 1035, a ¼ wavelength plate 1036, and the objective lens 1037.

The optical pickup 1003 includes a focus actuator 1301 supporting the objective lens 1037. The focus actuator 1301 performs focus servo control in which the objective lens 1037 is shifted in the direction perpendicular to the surface of the optical disc 1001 (the direction of the optical axis) based on the level and polarity of a supplied driving signal, and a light beam emitted from the light source is condensed on a predetermined recording layer.

As shown in FIG. 14, the light beam emitted from the semiconductor laser 1031 comes into the polarization beam splitter 1033 via the collimator lens 1032. The polarization beam splitter 1033 has a polarizing mirror, and the incident light beam passes through the polarization beam splitter 1033, has its optical path changed perpendicularly by the mirror 1035, passes through the ¼ wavelength plate 1036, and is irradiated upon the information recording plane of the optical disc 1001 from the objective lens 1037. Thus, in the irradiation optical system, the objective lens 1037 condenses or focuses a light beam upon a series of pits or a track helically or concentrically formed on the optical disc 1001, and forms a light spot on the recording plane. With the irradiation light beam spot, recording information is written/read to/from the information recording plane of the optical disc.

Detection Optical System in Optical Pickup

As shown in FIG. 14, the optical pickup 1003 further includes a detection optical system including the objective lens 1037, the mirror 1035, the polarization beam splitter 1033, a half mirror or beam splitter 1033*a*, first and second condenser lenses 1302, 1302*a*, and first and second optical elements 1303, 1303*a*. The optical pickup also includes first and second photodetectors 1400, 1400*a* to receive return light from the optical disc 1001. The detection optical system shares the objective lens 1037, the mirror 1035 and the polarization beam splitter 1033 with the irradiation optical system.

The detection optical system includes a first focus error signal detection portion and a second focus error signal detection portion which share the beam splitter 1033*a*. The first focus error signal detection portion includes the first condenser lens 1302, the first optical element 1303 and the first photodetector 1400, and the second focus error signal detection portion includes the second lens 1302*a*, the second optical element 1303*a* and the second photodetector 1400*a*.

The first focus error signal detection portion generates a first focus error signal having a first capture range smaller than the smallest distance between adjacent recording layers in the optical disc 1001. The second focus error signal detection portion generates a second focus error signal having a second capture range larger than the first capture range.

In the first and second focus error signal detection portions, the first and second focus error signals having the first and second capture ranges are generated for example according to the astigmatism method. According to the embodiment, the focus error signals having the capture ranges are formed according to the astigmatism method, while the invention is not limited to the method, and various other methods including Foucault and spot size methods may be applied. The first and second focus error signal detection portions do not have to obtain the first and second focus error signals according to the same method, in other words, the signals may be obtained by different approaches.

According to the embodiment, the first and second optical elements 1303, 1303*a* are astigmatism generating optical elements of a light transmitting material such as a cylindrical lens, while they may be a diffraction element such as a holographic lens.

As shown in FIG. 14, return light reflected from a light beam spot on a recording plane of the optical disc 1001 is guided to the photodetectors by the detection optical system. More specifically, the return light again comes into the polarization beam splitter 1033 through the objective lens 1037, the ¼ wavelength plate 1036, and the mirror 1035. In this case, the return light has its optical path changed toward a direction different from the direction toward the semiconductor laser 1031 by the polarization beam splitter 1033, and guided to the beam splitter 1033*a*. The beam splitter 1033*a* splits the return light, guides the split light portions to the first and second condenser lenses 1302, 1302*a* and the first and second optical elements 1303, 1303*a* for supply to the first and second focus error signal detection portions including the first and second photodetectors 1400 and 1400*a*. The light receiving portions of the photodetectors photoelectrically converts the received light. The photodetection electrical signals output by the photoelectric conversion are subjected to a predetermined operation by the servo-signal generating operation circuit, and the first and second focus error signals are generated. The intensities of the first and second focus error signals depend on the beam splitter 1033*a*.

Generation of Focus Error Signals

The astigmatism method will be described in which the first and second focus error signal detection portions obtain the first and second focus error signals having the first and second capture ranges of different ranges.

Figure 15:
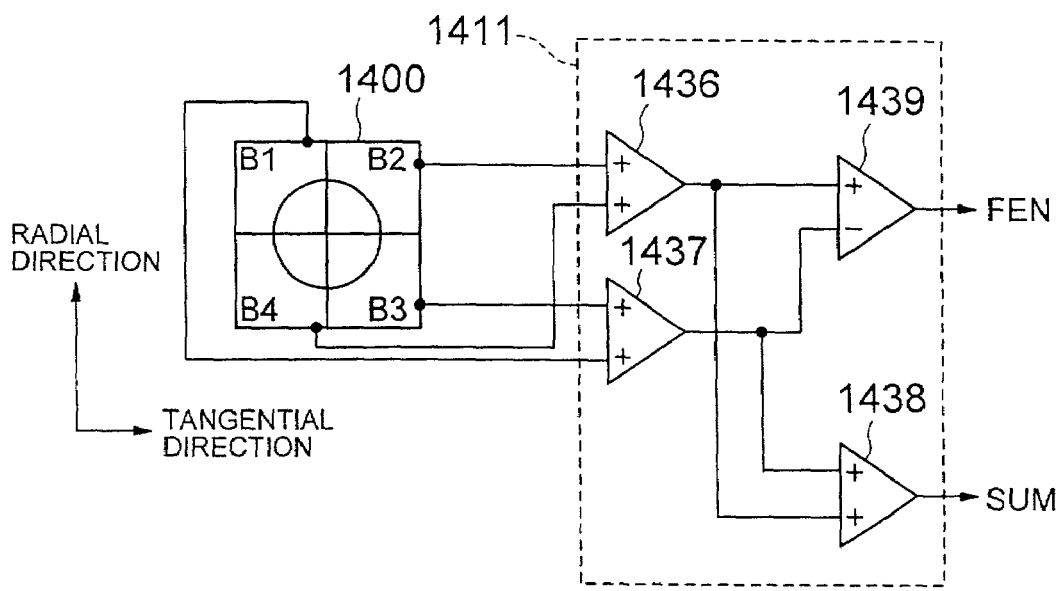
FIG. 15 is a schematic block diagram of one photodetector in the optical pickup according to the present invention.
Figure 16:
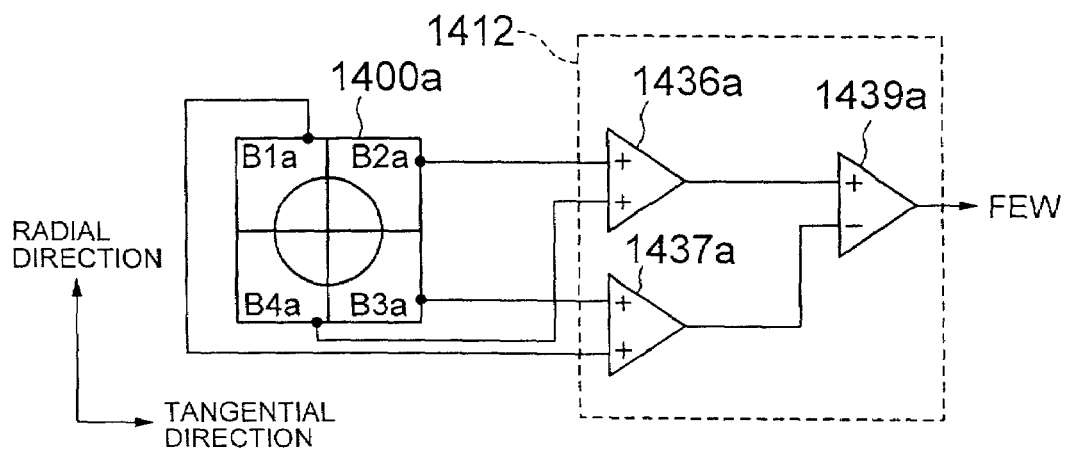
FIG. 16 is a schematic block diagram of the other photodetector in the optical pickup according to the present invention.

As shown FIG. 15, the first photodetector 1400 includes four equal area, light receiving portions (B1, B2, B3, B4) independent from each other and provided in the vicinity of each other with two orthogonal dividing lines as the boundaries wherein one of the dividing lines is parallel to the extending direction of the track. As shown in FIG. 16, the second photodetector 1400*a* also includes four equal area, light receiving portions (B1*a*, B2*a*, B3*a*, B4*a*) independent from each other and provided in the vicinity of each other with two orthogonal dividing lines as the boundaries wherein one of the dividing lines is parallel to the track extending direction. The first and second photodetectors 1400 and 1400*a* are provided such that a light spot is in a focused state on the optical disc 1001, return light forms a circle of least confusion, and the circle is provided at the intersection of the dividing lines for the first photodetector 1400.

Figure 17:
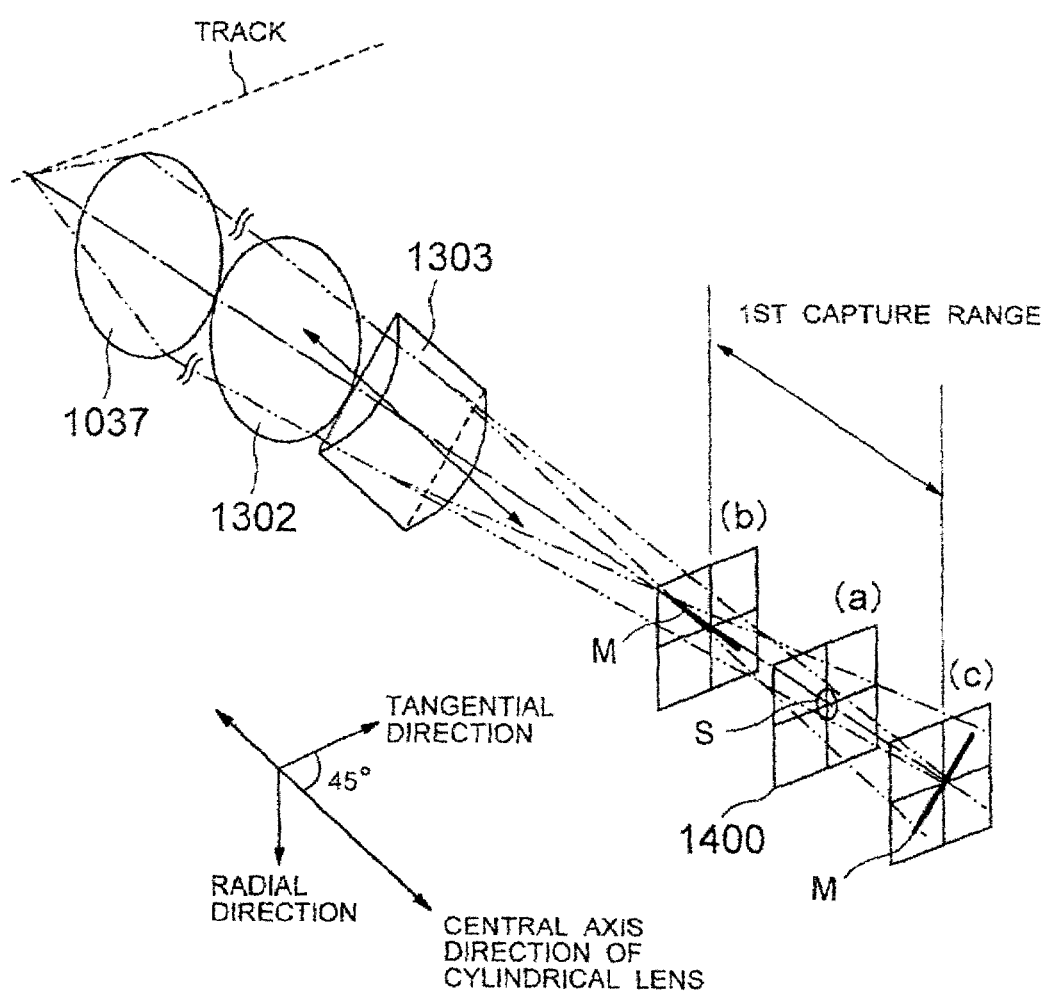
FIG. 17 is a schematic perspective view of the configuration of a photodetection optical system in the optical pickup according to the present invention.

As shown in FIG. 17, the first optical element 1303 such as a cylindrical lens in the first focus error signal detection portion is provided in the optical path of the return light so that the central axis (the rotation symmetry axis of the cylindrical surface forming a lens surface) extends at an angle of 45° with respect to the track extending direction of the optical disc. Thus, the return light to be condensed by the first condenser lens 1302 is provided with astigmatism. With this arrangement, a line image M, a circle of least confusion B and a line image S are formed based on the distance between the optical disc 1001 (the track on a recording layer) and the objective lens 1037. Therefore, the detection optical system irradiates light in the circle of least confusion B in FIG. 17 at (a) to the first photodetector 1400 when the light beam is in a focused state. The system irradiates a line image and an elliptical light spot extending diagonally on the light receiving plane as shown in FIG. 17 at (b) or (c) to the first photodetector 1400 in a defocus state. The light spot changes depending upon the defocus amount. Therefore, the distance between the line images condensed by the return light, i.e., the distance between (b) and (c) as shown in FIG. 17 corresponds to the first capture range (astigmatic difference) of the focus error signal.

In the optical system in the first focus error signal detection portion, the focal positions or the like of the first condenser lens 1302 and the first optical element 1303 are changed, so that the size of the first capture range can be changed. Therefore, the first capture range can be set to be $\frac{1}{10}$ or less of the least inter-layer distance (the thickness of an intermediate layer) among the distances between the recording layers in the optical disc 1001.

Similarly, since the astigmatism method is employed at the second focus error signal detection portion, the second focus error signal having the second capture range in a different size from the first capture range can be obtained when the second condenser lens 1302*a* and the second optical element 1303*a* are suitably designed. For example, in the second focus error signal detection portion, the second condenser lens 1302*a* and the second optical element 1303*a* are set so that the second capture range is greater than the sum of the thicknesses of all the recording layers and the intermediate layers stacked on one another in the optical disc 1001.

As shown in FIG. 15, the first photodetector 1400 in the first focus error signal detection portion for detecting the defocus amount of the optical system is connected to the first servo-signal generating operation circuit 1411 which generates the first focus error signal FEN having the first capture range based on the output signal of the first photodetector 1400.

The first servo-signal generating operation circuit 1411 includes addition circuits 1436, 1437, and 1438, and a subtraction circuit 1439. The subtraction circuit 1439 performs subtraction between the output signals of the addition circuits 1436 and 1437 ((B1+B3)−(B2+B4)), and the output is used to produce the first focus error signal FEN. More specifically, when the outputs of the light receiving portions in the second photodetector 1400 are represented by the reference characters, the resulting focus error signal (i.e., the first focus error signal) FEN having the first capture range is given by the following expression (1):

$$FEN=(B1+B3)-(B2+B4) \quad (1)$$

Note that the outputs of the addition circuits 1436 and 1437 resulting from addition of the photoelectric conversion signals of the light receiving portions (B1+B3) (B2+B4) positioned in point-symmetry with respect to the light receiving center on the light receiving plane of the first photodetector 1400 are added by the addition circuit 1438 to produce a focus sum signal SUM. In addition, the focus sum signal SUM is transmitted as an RF signal to a read signal processing system (not shown) via an RF amplifier and an equalizer (both not shown). The photoelectric conversion signals of the light receiving portions (B1+B2) and (B3+B4) divided by a dividing line in the tangential direction are used as tracking error signals.

As shown in FIG. 16, the second photodetector 1400*a* in the second focus error signal detection portion is connected to the second servo-signal generating operation circuit 1412 which generates the second focus error signal FEW having the second capture range based on the output signal of the second serve signal generation operation circuit.

The second servo-signal generating operation circuit 1412 includes addition circuits 1436*a*, 1437*a* and a subtraction circuit 1439*a*. The subtraction circuit 1439*a* performs subtraction between the output signals of the addition circuits 1436*a* and 1437*a* ((B1*a*+B3*a*)−(B2*a*+B4*a*)) and the output is used to generate the second focus error signal FEW. More specifically, when the outputs of the light receiving portions in the second photodetector 1400*a* are represented by the reference characters, the resulting focus error signal (i.e., the second focus error signal) FEW having the second capture range is given by the following expression (2):

$$FEW=(B1a+B3a)-(B2a+B4a) \quad (2)$$

Thus, according to the present invention, focus control is performed to a multi-layer optical disc having at least two recording layers in a optical pickup using the first focus error signal detection portion (hereinafter, referred to as "FEN detection system") for generating the first focus error signal FEN having a first capture range smaller than the smallest distance between adjacent recording layers in the optical disc 1001, and a second focus error detection portion (hereinafter, referred to as "FEW detection system") for generating the second focus error signal FEW having a second capture range larger than the first capture range.

A focus error signal in a three-layer optical disc 1001 including first to third recording layers formed at an interval of 1.0 μm between adjacent recording layers and having intermediate layers therebetween according to the embodiment will be now described by way of illustration.

Figure 2B:
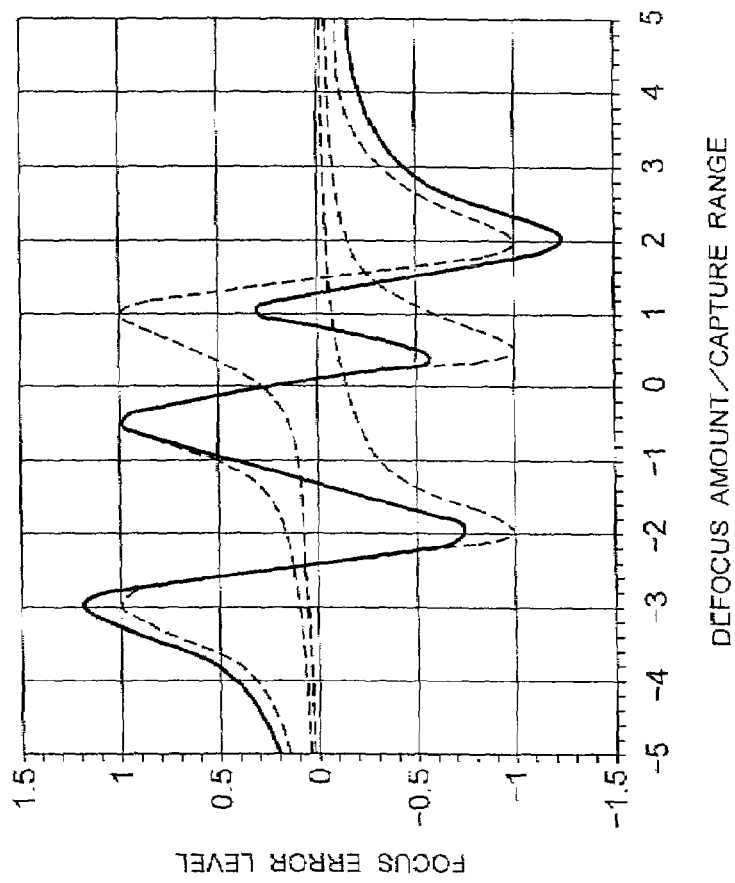
FIGS. 2A and 2B are graphs showing changes in the focus error signal when the relation between the layer interval in a three-layer optical disc and the capture range is changed.
Figure 2A:
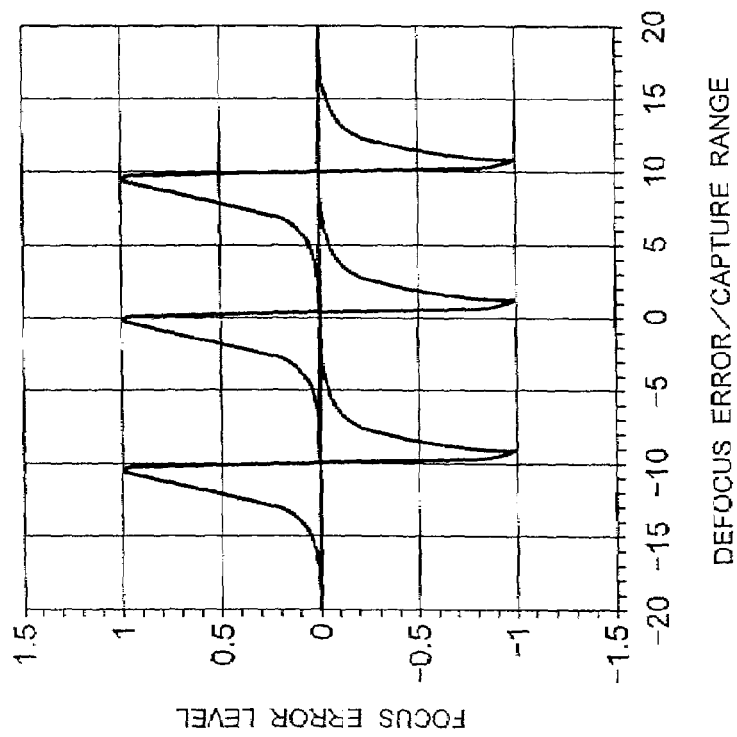
Figure 18:
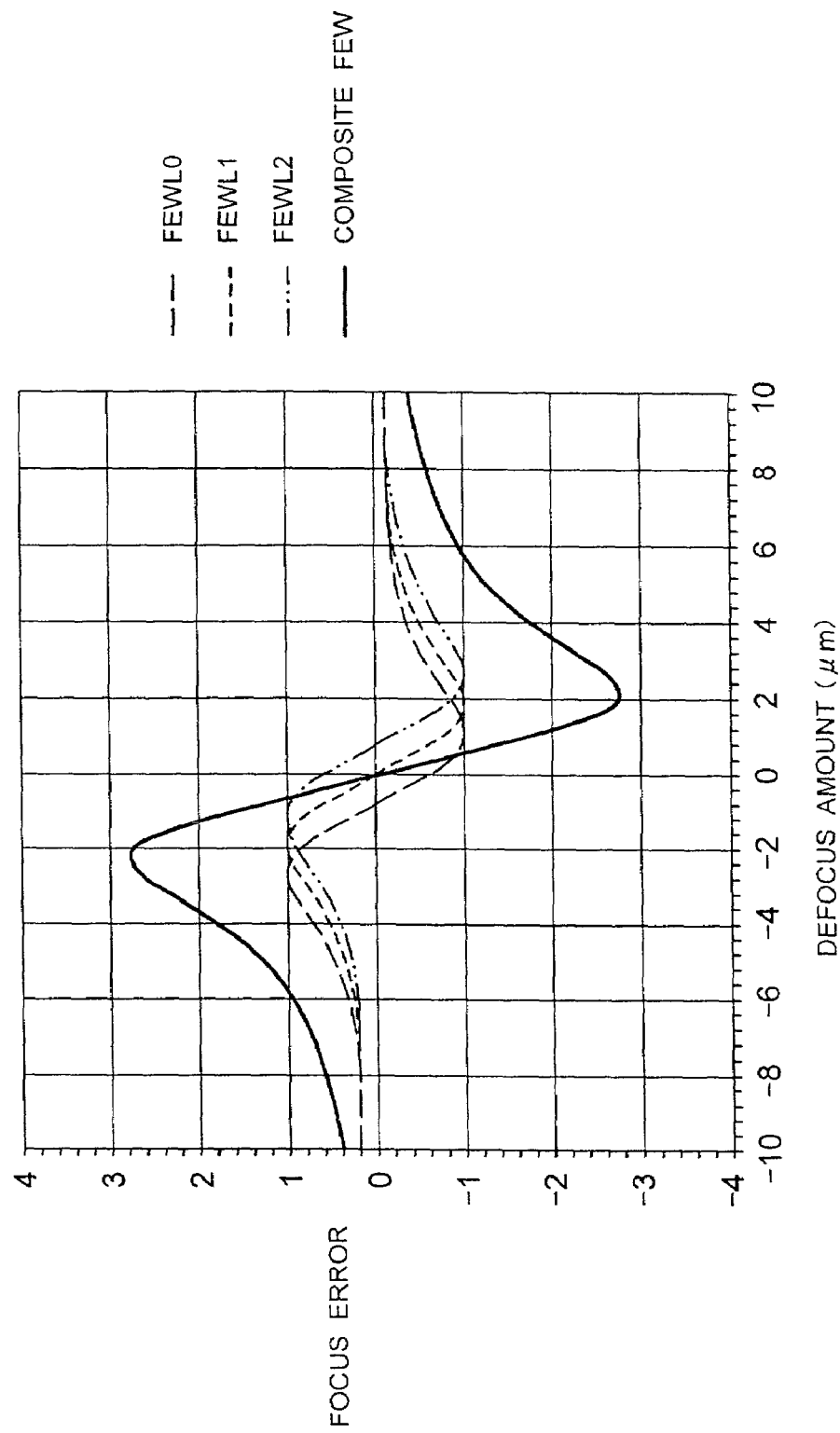
FIG. 18 is a graph showing the relation between the focus amount and the focus error signal in a three-layer optical disc according to an embodiment of the present invention.
Figure 19:
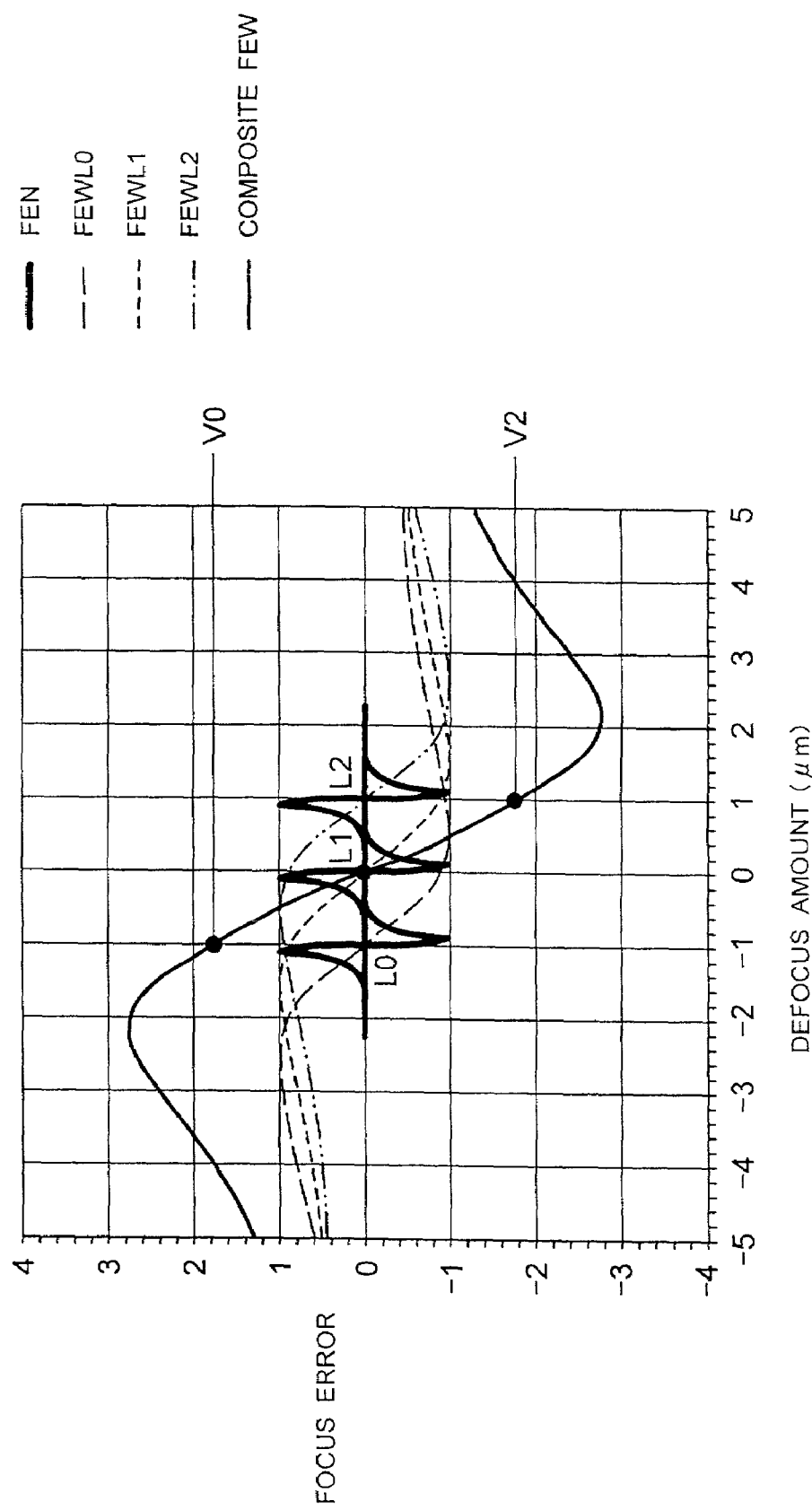
FIG. 19 is an expanded representation of FIG. 18.

The second photodetector 1400*a* in the FEW detection system outputs second focus error signals FEWL0, FEWL1, and FEWL2 shifted for recording layer intervals corresponding to the first to third recording layers in the optical disc 1001 as shown in FIG. 18. The capture range is 4.0 μm which is wider than the recording layer interval of 1.0 μm, and therefore in reality a composite output (solid line) is obtained. More specifically, since the second focus error signal FEW is obtained as a composite output of FEWL0, FEWL1, and FEWL2, and therefore the capture range of the composite FEW is a little more than 4.0 μm, which is about four times the recording layer interval, or twice the distance between the first layer and the furthest third layer. FIG. 19 is an expanded representation of FIG. 18, and as can be seen, the focus error signals from the recording layers are formed into a composite clear S curve. On the other hand, a detection system having a smaller capture range than the recording layer interval has small peaks or dips between the maximum peaks of the S curve similarly to the case as shown in FIG. 2B, and is not suitable for the FEW detection system.

As shown in FIG. 19, the FEN detection system generates the first focus error signal FEN having a capture range of about 0.1 μm (which is $\frac{1}{10}$ of the recording layer interval).

Focus Servo Loop Control

Figure 20:
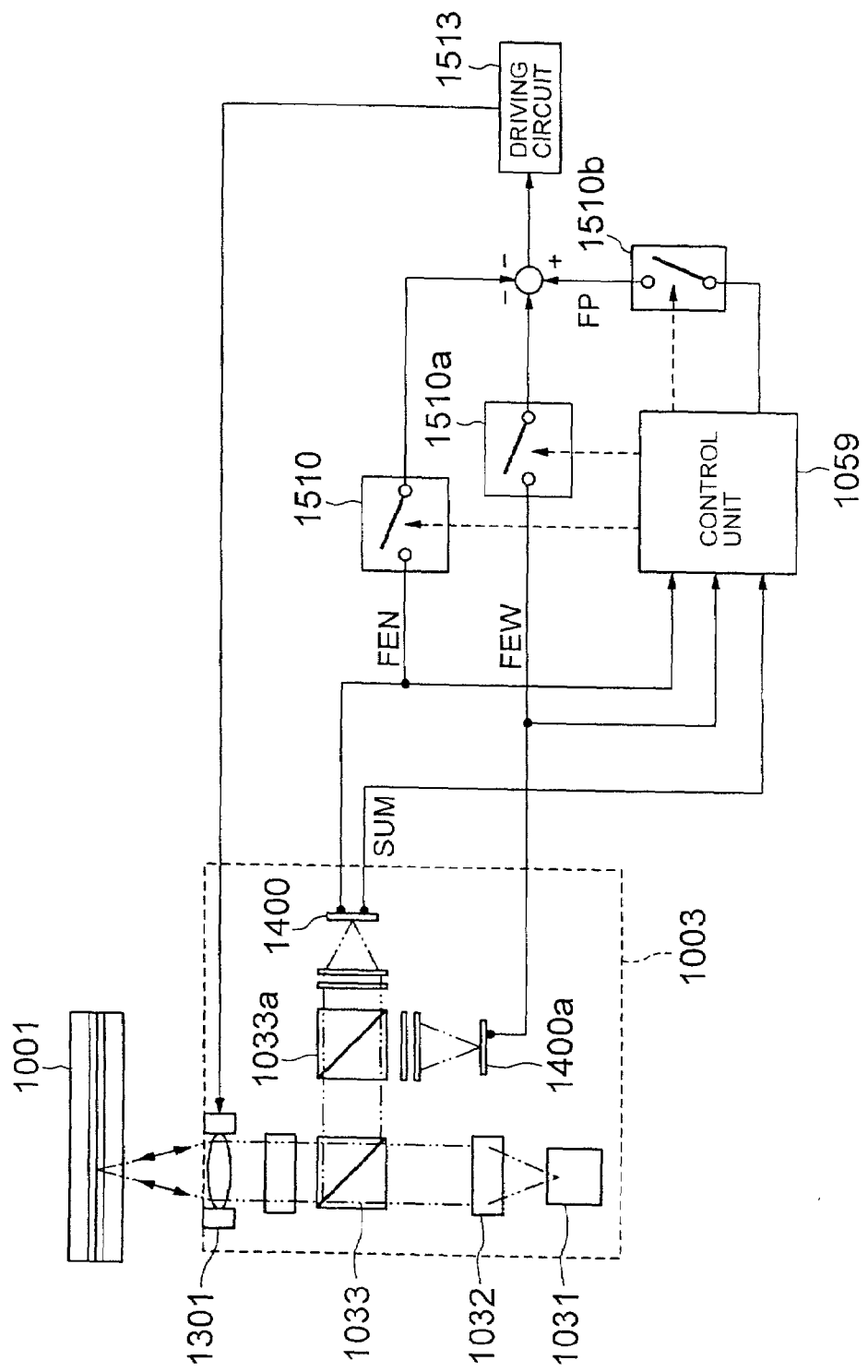
FIG. 20 is a schematic block diagram of an optical pickup according to an embodiment of the present invention.

As shown in FIG. 20, the first focus error signal FEN obtained from the optical pickup 1003 is supplied to a switch circuit 1510 connected to the optical pickup 1003. The switch circuit 1510 supplies the first focus error signal FEN through an adder connected thereto to a driving circuit 1513 including an amplification circuit, a phase compensation circuit, and an equalizer. The second focus error signal FEW obtained from the optical pickup 1003 is supplied to the switch circuit 1510*a* connected to the optical pickup 1003, and supplied to the driving circuit 1513 through an adder connected thereto.

The first and second focus error signals FEN, FEW are supplied to the control unit 1059 connected to the optical pickup 1003. The control unit 1059 includes a filter, an A/D conversion circuit, a D/A conversion circuit and a microcomputer including a processor, a ROM, and a RAM. The control unit 1059 receives commands from the system controller, stores predetermined threshold values, and generates various signals. The control unit 1059 detects the level of the focus error signals, and the first focus error signal FEN attaining a predetermined level such as the zero level. In other words, the control unit performs zero-cross detection. The zero-cross detection permits the relative position of the recording layers to be detected. The control unit 1059 generates a forcing signal FP and the like, and supplies the generated signals to the driving circuit 1513 through the switch circuit 1510b connected to the control unit 1059 and the adder connected to the switch circuit 1510b.

The control unit 1059 supplies the switch circuits 1510, 1510a, and 1510b with control signals to control their closing/opening. Switching control is performed in response to the control signals. At least one of the focus error signals is selected for output to the driving circuit 1513 when a control signal indicates that a focus servo loop must be closed. The forcing signal FP from the control unit 1059 is selected for output to the driving circuit 1513 when the control signal indicates that the loop must be open and the focus actuator 1301 must forcibly be driven.

The driving circuit 1513 generates a driving signal based on the output of the adder provided after the switch circuit to output the signal to the focus actuator 1301. Thus, when the focus servo loop to relay the output signal of the switch circuit to the driving circuit 1513 is closed, the focus actuator 1301 is driven so that the level of the focus error signal is zero, in other words, so that the focused position of the light beam follows a predetermined recording plane.

Example of Sequential Focus Pull-in Operation

One kind of focus pull-in operation (hereinafter, simply referred to as "focus pull-in") executed by the control unit 1059 on the multi-layer optical disc will now be described.

In response to a focus search signal from the control unit 1059 shown in FIG. 20, the switch circuit 1510 in the FEN detection system and the switch circuit 1510a in the FEW detection system are opened. The control unit 1059 closes the switch circuit 1510b to the side of the control unit 1059, and a triangular pulse generated in the control unit 1059 for example is input to the driving circuit 1513. The signals detected by the photodetectors are operated in the servo generation operation circuit. Then, the control unit 1059 obtains the first and second focus servo signals FEN and FEW. The control unit 1059 in the setup operation mode compares the level of a signal SUM from the optical pickup to a threshold level applied from the memory and determines the completion of the setup operation when the signal level exceeds the threshold level. The control unit, then, starts focus servo control while retaining the setting of the focus servo loop at the time. Note that the zero-cross detection circuit in the control unit 1059 determines whether the disc is a single layer disc or a multi-layer disc, counts the number of the recording layers, and measures the layer interval and the like using the first focus error signal FEN. The determination is performed by counting the number of zero-cross points and clocking in the first focus error signal FEN.

In the focus pull-in routine, the control unit 1059 allows the switch circuit 1510b and the switch circuit 1510a in the FEN detection system to be open, and closes the switch circuit 1510a in the FEW detection system so that the second focus error signal FEW is input to the driving circuit 1513. Thus, a light spot is controlled to be between the first and m-th recording layers using the second focus error signal FEW having a second capture range larger than the distance between the first and the n-th recording layers in the n-layer optical disc.

Before the m-th layer ($1 \leq m \leq n$) as predetermined for focusing is reached, the control unit 1059 closes the switch circuits 1510a and 1510b, while a deceleration signal generated by the control unit 1059 is added to the second focus error signal FEW, so that the light spot moves toward the m-th recording layer.

When the control unit 1059 detects the level of the first capture range of the first focus error signal FEN in the m-th recording layer, the switch circuits 1510a and 1510b are let open, while the switch circuit 1510 in the FEN detection system is closed, and the first focus error signal FEN is input to the driving circuit 1513.

Thus, in the sequential focus pull-in, using the FEW detection system generating the second focus error signal FEW having a wide second capture range, focus is set between the first recording layer and the recording layer the furthest from the first recording layer. Then, using the FEN detection system generating the first focus error signal FEN having a normal narrow capture range, focus is set to a predetermined recording layer.

Figure 21:
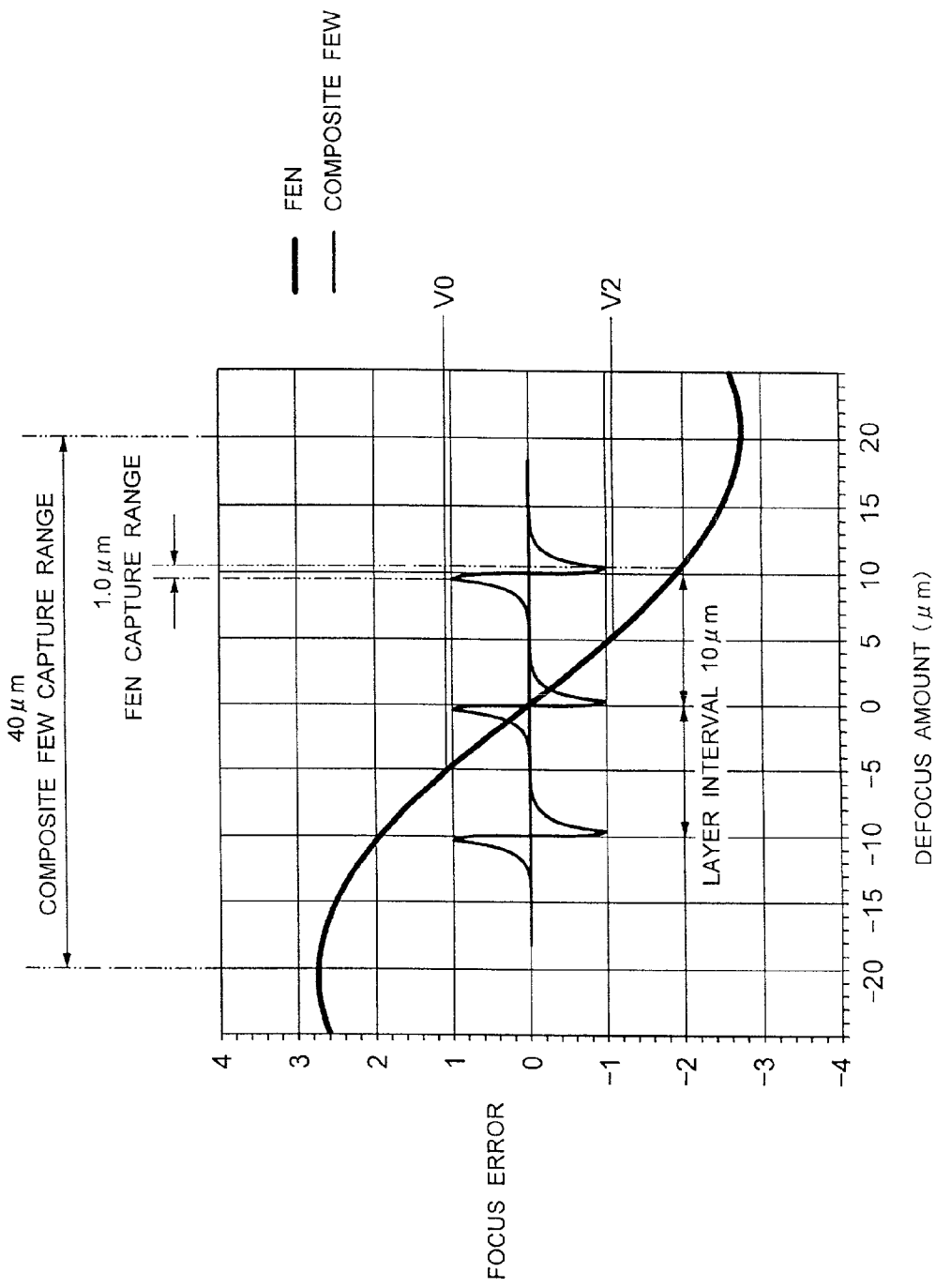
FIG. 21 is a graph showing the relation between the defocus amount and the focus error signal in a three-layer optical disc according to another modification of the second embodiment.

For example, in a case of a three-layer disc including first to third recording layers formed at an interval of 10 $\mu$m between adjacent recording layers and having intermediate layers therebetween, as shown in FIG. 21, the FEN detection system must generate the first focus error signal FEN having a capture range of about 1.0 $\mu$m (1/10 of the recording layer interval). This makes the focus pull-in difficult and vulnerable to disturbances. However, the capture range of the composite FEW is about 40 $\mu$m, which is four times the recording layer interval, in other words twice the largest interval between the first layer and the third layer. As a result, the large second capture range alleviates the focus pull-in operation.

Example of Focus Pull-in Operation with Disturbances

Another kind of focus pull-in operation executed by the control unit 1059 in a multi-layer optical disc will be described.

When focus is set to a predetermined recording layer (within the first capture range) according to the first focus error signal FEN having the narrow capture range from the FEN detection system, and the control unit 1059 determines that the first focus error signal FEN is beyond a predetermined value, the control circuit 1059 shown in FIG. 20 opens the switch circuit 1510 in the FEN detection system and the switch circuit 1510b, closes the switch circuit 1510a in the FEW detection system, and inputs the second focus error signal FEW to the driving circuit 1513. By the operation, switching is made from the focus pull-in with the narrow capture range to a predetermined recording layer, focus pull-in is performed between the first recording layer and the recording layer the furthest from the first recording layer. When the servo control is almost interrupted, for example, FEN is equal to or larger than the level corresponding to ±0.3 $\mu$m when the capture range of the focus error signal FEN is 1.0 $\mu$m, the servo control may be switched to the control with the second focus error signal FEW, so that the light spot is controlled between the first and third recording layers, and the objective lens 1037 does not collide with the optical disc 1001. The servo re-pull-in with first focus error signal FEN can quickly be performed.

Another Example of Focus Pull-in Operation with Disturbances

Another kind of focus pull-in operation executed by the control unit 1059 in a multi-layer optical disc will now be described.

The control unit 1059 shown in FIG. 20 has a function of detecting the level of the focus error signal when servo control is in progress to any of the first, second and third recording layers according to the first focus error signal FEN having a narrow capture range from the FEN detection system. Therefore, the control unit 1059 obtains level values for the second focus error signal FEW from the FEW detection system, i.e., V0 for the first recording layer, zero for the second recording layer, and V2 for the third recording layer as shown in FIG. 21. The level values may be inverted for supply to a hold circuit, and added to the second focus error signal FEW through the switch circuit 1510b and the result may be supplied to the driving circuit 1513. More specifically, when servo control is performed aimed at the level of the second focus error signal FEW at a zero-cross point (recording layer) of the first focus error signal FEN, the servo control can be conducted to the same recording layer using both signals FEW and FEN. Thus, when focus is set to a predetermined recording layer by the first focus error signal FEN, and focus control is executed using the second focus error signal FEW with a predetermined offset value, focus servo control is executed with the focus error signal having a wide capture range, so that focus servo control withstanding disturbances can be provided.

Modification of the Embodiment

Figure 22:
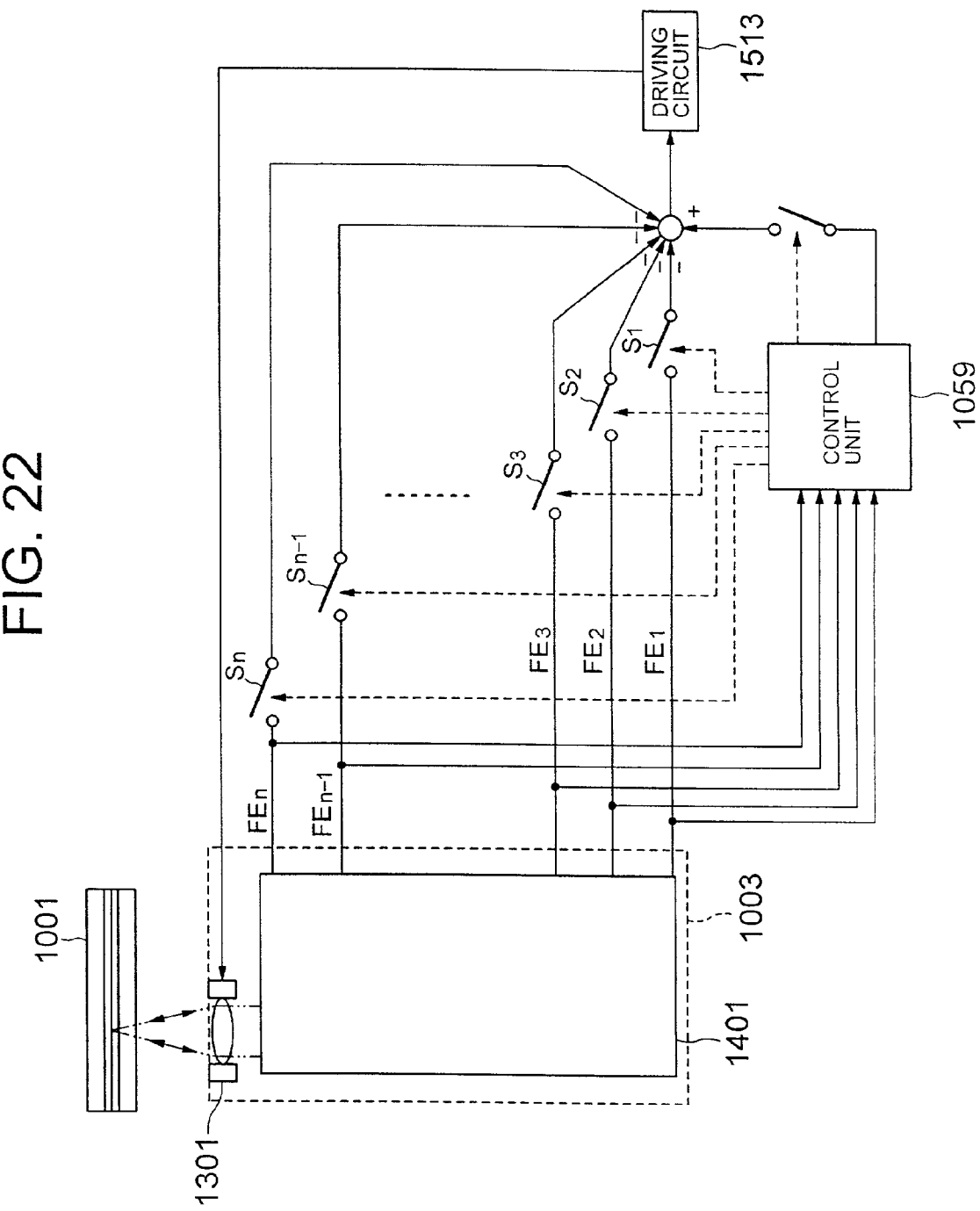
FIG. 22 is a schematic block diagram of an optical pickup according to another modification of the second embodiment.

In the above described embodiment, the optical pickup has two detection systems, i.e., the FEN system generating the first focus error signal FEN having a first capture range smaller than the smallest of the distances between adjacent recording layers in a multi-layer optical disc, and the FEW detection system generating the second focus error signal FEW having a second capture range wider than the first capture range. The present invention is not limited to this arrangement. As shown in FIG. 22, another optical pickup may include a focus error signal generation portion 1401 including multiple detection portions for generating focus error signals having different capture ranges, for example multiple focus error signals FE1, FE2, FE3, . . . , FEn-1, and FEn having capture ranges increasing in this order, switch circuits S1, S2, S3, . . . , Sn-1, and Sn connected to the above portion and provided in respective paths, and a control unit 1059 connected to the paths of the multiple focus error signals for controlling the opening/closing of the switch circuits. Thus, the focus error signals may be detected from those with wider capture ranges to those with narrower capture ranges simultaneously or sequentially. A focus error signal having a capture range of a predetermined size selected by the control of the control unit 1059 may be supplied to the driving circuit 1513 through an adder and the focus actuator 1301 may be driven according to the focus error signal. Thus, servo control withstanding disturbances can be implemented by executing focus pull-in while switching between the focus error signals from those with wide capture ranges to those with narrower capture ranges.

According to the present invention, servo control withstanding disturbances and precise focus servo control less affected by other layers can be implemented since the focus error signals with wide capture ranges and the focus error signals with narrow capture ranges are detected. Furthermore, a light spot can be controlled to be between the first recording layer and the furthest recording layer from the first recording layer in a multi-layer optical disc. Therefore, a light spot may easily be positioned in the vicinity of a recording layer desired to be reproduced when performing focus pull-in. At the time, the focus pull-in can be executed to a desired recording layer unaffected by reflected light upon the disc plane or sway of the disc plane by performing focus pull-in using the first focus error signal, since the light spot is in the vicinity of the recording layer to be reproduced.

When information is recorded/reproduced while executing focus servo control using the first focus error signal, and focus is almost interrupted by disturbances (i.e., when FEN is beyond a predetermined value), the operation can be switched to the servo control using the second focus error signal; otherwise the objective lens collides with the disc and damages it as the servo control is interrupted according to the conventional method. In addition, the light spot is controlled to be in the vicinity of the recording layers of the disc, so that the focus servo control to the recording layer can be resumed in a short period of time.

Furthermore, an offset value corresponding to each recording layer to be focused is detected from the second focus error signal when the information is recorded/reproduced under focus servo control using the first focus error signal. Therefore, by performing servo control using the second focus error signal aimed at the offset value, servo control by both first and second focus error signals can be executed to a desired recording layer, so that stable focus servo control withstanding disturbances can be executed.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Applications No.2000-388541 and No.2001-27301 which are hereby incorporated by reference.

What is claimed is:

1. An optical pickup apparatus having an irradiation optical system for condensing a light beam into a spot on a track on a recording plane of an optical recording medium and a photodetection optical system for guiding return light reflected back from said spot to a photodetector, said optical pickup apparatus detecting the focal error of said light beam, said optical pickup apparatus comprising:

a holographic lens provided in the optical path of said return light in said photodetection optical system for outputting 0-th order diffracted light and ±1st order diffracted light based on said return light;

an optical element provided in one of two positions, a first position in front of and a second position behind said holographic lens in the optical path of said return light in said photodetection optical system for providing astigmatism a photodetector for receiving the 0-th order diffracted light output from said holographic lens;

a photodetector for receiving the ±1st order diffracted light output from said holographic lens;

a servo-signal generating operation circuit for the 0-th order diffracted light connected to said photodetector for the 0-th order diffracted light for generating a first focus error signal having a first capture range based on the output signal of the photodetector; and a servo-signal generating operation circuit for the ±1st order diffracted light connected to the photodetector for said ±1st order diffracted light for generating a second focus error signal having a second capture range different from said first capture range based on the output signal of the photodetector.

2. The optical pickup apparatus according to claim 1, wherein said holographic lens is set so that said 0-th order diffracted light has a greater quantity of light than said ±1st order diffracted light.

3. The optical pickup apparatus according to claim 1, wherein said 0-th order diffracted light photodetector includes four independent light receiving portions provided in the vicinity of each other with two orthogonal dividing lines as boundaries, one of the dividing lines being provided parallel to an extending direction of the track, wherein an area of the light receiving portions of positive polarity and an area of the light receiving portions of negative polarity are substantially equal, the light receiving portions of positive polarity and negative polarity being connected to said servo-signal generating operation circuit for the 0-th order diffracted light.

4. The optical pickup apparatus according to claim 1, wherein said optical element to provide the astigmatism is a cylindrical lens being provided in the optical path of return light so that the central axis of said optical element extends at an angle of 45° with respect to the track extending direction of the optical disc.

5. The optical pickup apparatus according to claim 1, wherein said photodetector for ±1st-order diffracted light includes at least two independent light receiving portions provided in the vicinity of each other with at least two dividing lines extending approximately parallel in a vertical direction to the track extending direction as boundaries,
wherein an area of the light receiving portions of positive polarity and an area of the light receiving portions of negative polarity are substantially equal, the light receiving portions of positive polarity and negative polarity being connected to said servo-signal generating operation circuit for the ±1st-order diffracted light.

6. The optical pickup apparatus according to claim 1, wherein said first capture range is smaller than said second capture range.

7. The optical pickup apparatus according to claim 1, wherein a tracking error signal is generated based on said 0-th order diffracted light.

8. The optical pickup apparatus according to claim 1, wherein the first focus error signal is generated by an astigmatism method, and the second focus error signal is generated by a differential spot size method.

9. An optical pickup apparatus having an irradiation optical system for condensing a light beam into a spot on a track of a recording layer of an optical recording medium having at least two recording layers stacked upon one another with an intermediate layer therebetween, and a photodetection optical system for guiding return light reflected back from the spot into a photodetector, said optical pickup apparatus detecting the focus error of the light beam, said apparatus comprising:
a focus error signal generation portion for generating a plurality of focus error signals each having a capture range, said capture ranges being different from one another,
wherein said focus error signal generation portion comprises:
a first focus error signal detection portion for generating a first focus error signal having a first capture range smaller than the smallest of the distances between adjacent recording layers in the optical recording medium; and
a second focus error signal detection portion for generating a second focus error signal having a second capture range larger than said first capture range.

10. The optical pickup apparatus according to claim 9, wherein said first capture range is at most ¹⁄₁₀ of the smallest of the distances between said adjacent recording layers.

11. The optical pickup apparatus according to claim 9, wherein said second capture range is larger than the sum of the thicknesses of all stacked recording layers and intermediate layers.

12. The optical pickup apparatus according to claim 9, further comprising:
a position detection portion for detecting the relative position of said recording layers in said optical recording medium based on the first focus error signal generated by said first focus error signal detection portion; and
a selection portion for selecting and relaying at least one of said first and second focus error signals from said first and second focus error signal detection portions in response to a signal generated by said position detection portion.

13. The optical pickup apparatus according to claim 9, further comprising,
a focus pull-in portion for performing focus pull-in operation between recording layers most distant from each other among the stacked recording layers in response to the second focus error signal generated by said second focus error signal detection portion, and then performing focus pull-in to a predetermined recording layer in response to the first focus error signal generated by said first focus error signal detection portion.

14. The optical pickup apparatus according to claim 9, further comprising,
a focus pull-in portion for performing focus pull-in operation between recording layers most distant from each other among the stacked recording layers in response to the second focus error signal generated by said second focus error signal detection portion, when focus is pulled-in to a predetermined recording layer according to the first focus error signal generated by said first focus error signal detection portion and the first focus error signal generated by said first focus error signal detection portion is beyond a predetermined value.

15. The optical pickup apparatus according to claim 9, further comprising an offset value portion for adding a predetermined offset value based on the position of a predetermined recording layer to the second focus error signal generated by said second focus error detection portion when focus is pulled-in to said predetermined recording layer according to the first focus error signal generated by said first focus error signal detection portion.

16. A focus control method for an optical pickup, said optical pickup having an irradiation optical system for condensing a light beam into a spot on a track on a recording layer of an optical recording medium having at least two recording layers placed on one another with an intermediate layer therebetween; and a photodetection optical system for guiding return light reflected back from said spot to a photodetector, said optical pickup detecting a focus error of said light beam, said focus control method comprising the steps of:
a first focus error signal detection step of generating a first focus error signal having a first capture range smaller than the smallest distance between adjacent recording layers of the optical recording medium; and
a second focus error signal detection step of generating a second focus error signal having a second capture range larger than said first capture range.

17. The focus control method according to claim 16, wherein said second capture range is larger than the sum of the thicknesses of all stacked recording layers and intermediate layers.

18. The focus control method according to claim 16, further comprising the steps of:
   a position detection step for detecting the relative position of said recording layers in said optical recording medium based on the first focus error signal generated in the first focus error signal detection step; and
   a selection step for selecting and relaying at least one of said first and second focus error signals generated in the first and second focus error signal detection steps in response to a signal generated in the position detection step.

19. The focus control method according to claim 16, further comprising,
   a focus pull-in step for performing focus pull-in operation between recording layers most distant from each other among the stacked recording layers in response to the second focus error signal generated in the second focus error signal detection step, and then performing focus pull-in to a predetermined recording layer in response to the first focus error signal generated in the first focus error signal detection step.

20. The focus control method according to claim 16, further comprising,
   a focus pull-in step for performing focus pull-in operation between recording layers most distant from each other among the stacked recording layers in response to the second focus error signal generated in the second focus error signal detection step, when focus is pulled-in to a predetermined recording layer according to the first focus error signal generated in the first focus error signal detection step and the first focus error signal generated in the first focus error signal detection step is beyond a predetermined value.

21. The focus control method according to claim 16, further comprising an offset value adding step for adding a predetermined offset value based on the position of a predetermined recording layer to the second focus error signal generated in the second focus error detection step when focus is pulled-in to said predetermined recording layer according to the first focus error signal generated in the first focus error signal detection step.

* * * * *